United States Patent
Toyoda et al.

(10) Patent No.: US 6,493,103 B2
(45) Date of Patent: *Dec. 10, 2002

(54) IMAGE COMMUNICATING METHOD, FACSIMILE TYPE ELECTRONIC MAIL APPARATUS AND FACSIMILE APPARATUS

(75) Inventors: Kiyoshi Toyoda, Tokyo (JP); Tatsuo Bando, Tokyo (JP)

(73) Assignee: Matsushita Graphic Communication Systems, Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,277

(22) Filed: Mar. 18, 1998

(65) Prior Publication Data

US 2001/0015819 A1 Aug. 23, 2001

Related U.S. Application Data

(62) Division of application No. 08/734,321, filed on Oct. 21, 1996.

(30) Foreign Application Priority Data

Oct. 20, 1995 (JP) ............................................. 7-272697
Oct. 26, 1995 (JP) ............................................. 7-278836

(51) Int. Cl.$^7$ .............................. H04N 1/44; H04L 9/00
(52) U.S. Cl. ...................... 358/1.15; 358/402; 358/405; 358/438; 380/243; 380/281
(58) Field of Search ................................ 358/1.15, 400, 358/402, 403, 405, 448–451, 442, 468, 434, 438; 395/188.01; 380/18, 23, 30, 49, 243, 246, 281; H04N 1/44, 1/32

(56) References Cited

U.S. PATENT DOCUMENTS

| | | | | |
|---|---|---|---|---|
| 5,265,033 A | * | 11/1993 | Vajk et al. .................. | 709/206 |
| 5,331,424 A | * | 7/1994 | Matsui et al. ................ | 358/404 |
| 5,353,124 A | * | 10/1994 | Chou et al. .................. | 358/468 |
| 5,465,299 A | * | 11/1995 | Matsumoto et al. .......... | 380/23 |
| 5,485,368 A | * | 1/1996 | Ozaki et al. ................. | 358/402 |
| 5,491,752 A | * | 2/1996 | Kaufman et al. ............. | 380/30 |
| 5,509,074 A | * | 4/1996 | Choudhury et al. ......... | 713/176 |
| 5,521,720 A | * | 5/1996 | Yoshida ....................... | 358/448 |
| 5,541,993 A | * | 7/1996 | Fan et al. .................... | 380/243 |
| 5,608,786 A | * | 3/1997 | Gordon ....................... | 358/402 |
| 5,619,571 A | * | 4/1997 | Sandstrom et al. .......... | 380/200 |
| 5,642,420 A | * | 6/1997 | Kuroda et al. ............... | 380/30 |
| 5,719,938 A | * | 2/1998 | Haas et al. ................... | 705/52 |
| 5,737,454 A | * | 4/1998 | Park et al. ................... | 358/450 |
| 5,812,278 A | * | 9/1998 | Toyoda et al. .............. | 358/402 |
| 5,812,764 A | * | 9/1998 | Heinz, Sr. .............. | 395/188.01 |
| 5,881,233 A | * | 3/1999 | Toyoda et al. .............. | 358/402 |
| 5,944,794 A | * | 8/1999 | Okamoto et al. ........... | 709/225 |

* cited by examiner

Primary Examiner—Edward Coles
Assistant Examiner—Joseph R. Pokrzywa
(74) Attorney, Agent, or Firm—Greenblum & Bernstein, P.L.C.

(57) ABSTRACT

A particular image written in a particular paper of a particular paper size is scanned by a scanner to produce image data, a format of the image data is changed to a mail format to change the image data to mail data, the particular paper size is added to the mail data, and the mail data is transmitted from a transmitting side to a receiving side through a LAN by an electronic mail. In the receiving side, the mail data is changed to reproduced image data, and it is judged whether or not the particular paper size of the particular paper is larger than a prescribed paper size treatable on the receiving side. In cases where the particular paper size is larger than the prescribed paper size, the reproduced image data is thinned but to produce adjusted image data, and a downsized image is printed on a prescribed paper of the prescribed paper size according to the adjusted image data. Accordingly, even though an image written in a paper of a paper size not treatable on the receiving side is transmitted from the transmitting side to the receiving side, because the image is downsized, the image can be reproduced on the receiving side.

14 Claims, 23 Drawing Sheets

```
MIME-VERSION : 1.0
CONTENT-TYPE : MULTIPART/MIXED : CHARASET = ISO-2022-JP : BOUNDARY =
- - - -

CONTENT-TYPE : TEXT/PLAIN : CHARASET = ISO-2022-JP
RELAY 3491-9191  (FACSIMILE NUMBER OF RECEIVING SIDE)
  xxxxxxxx     (ENCIPHERED PASS-WORD)
THE TIFF IMAGE FILE FOLLOWS THIS TEXT
- - - -

CONTENT-TYPE : IMAGE/TIFF
CONTENT-TRANSFER-ENCODING : BASE 64
   (CONTENTS OF IMAGE DATA)
```

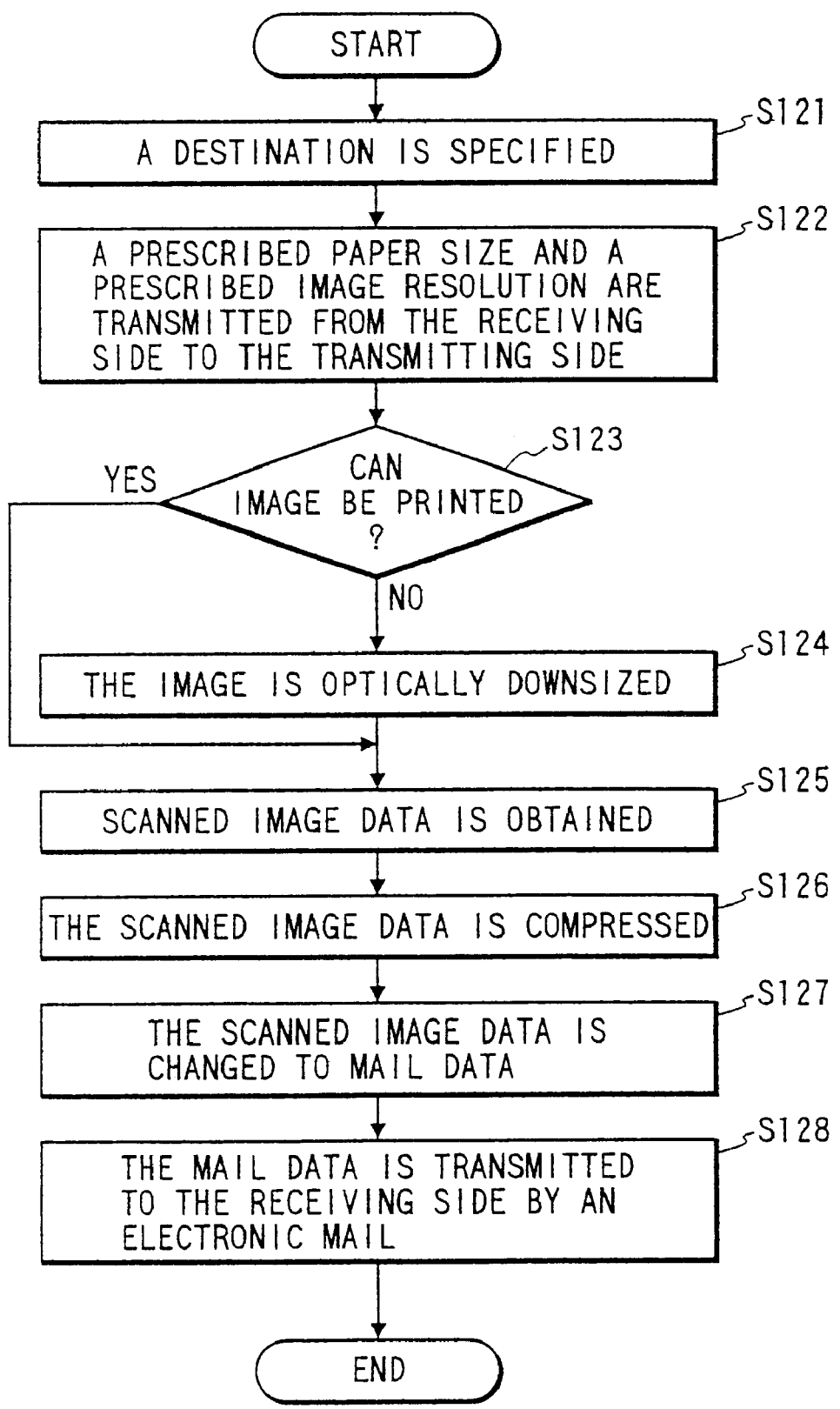

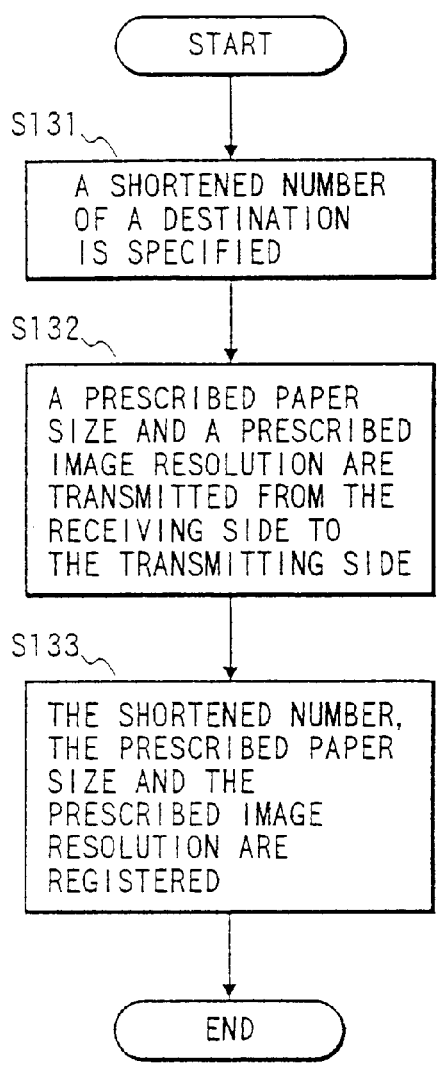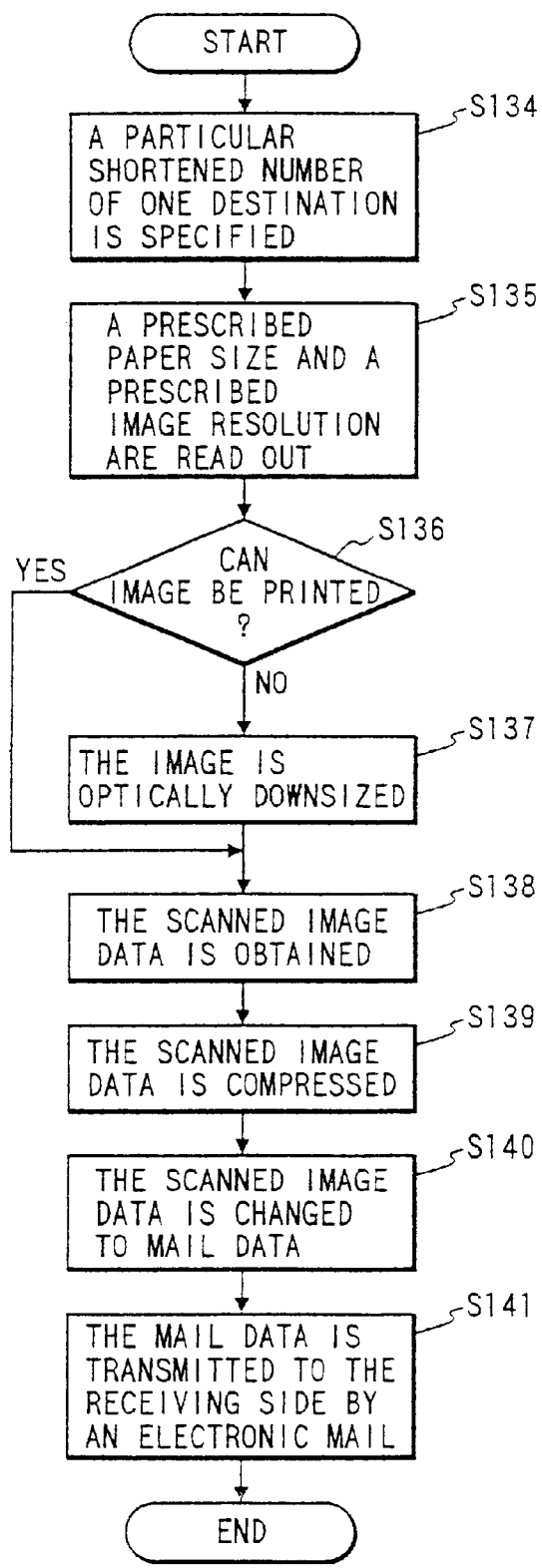

| CIPHER KEY | 0 1 → 0 0 0 0    0 0 0 1 |
| PASS-WORD | 3 1 → 0 0 1 1    0 0 0 1 |

⇩ INVERSION 0 0 1 1    0 0 0 0 → 3 0

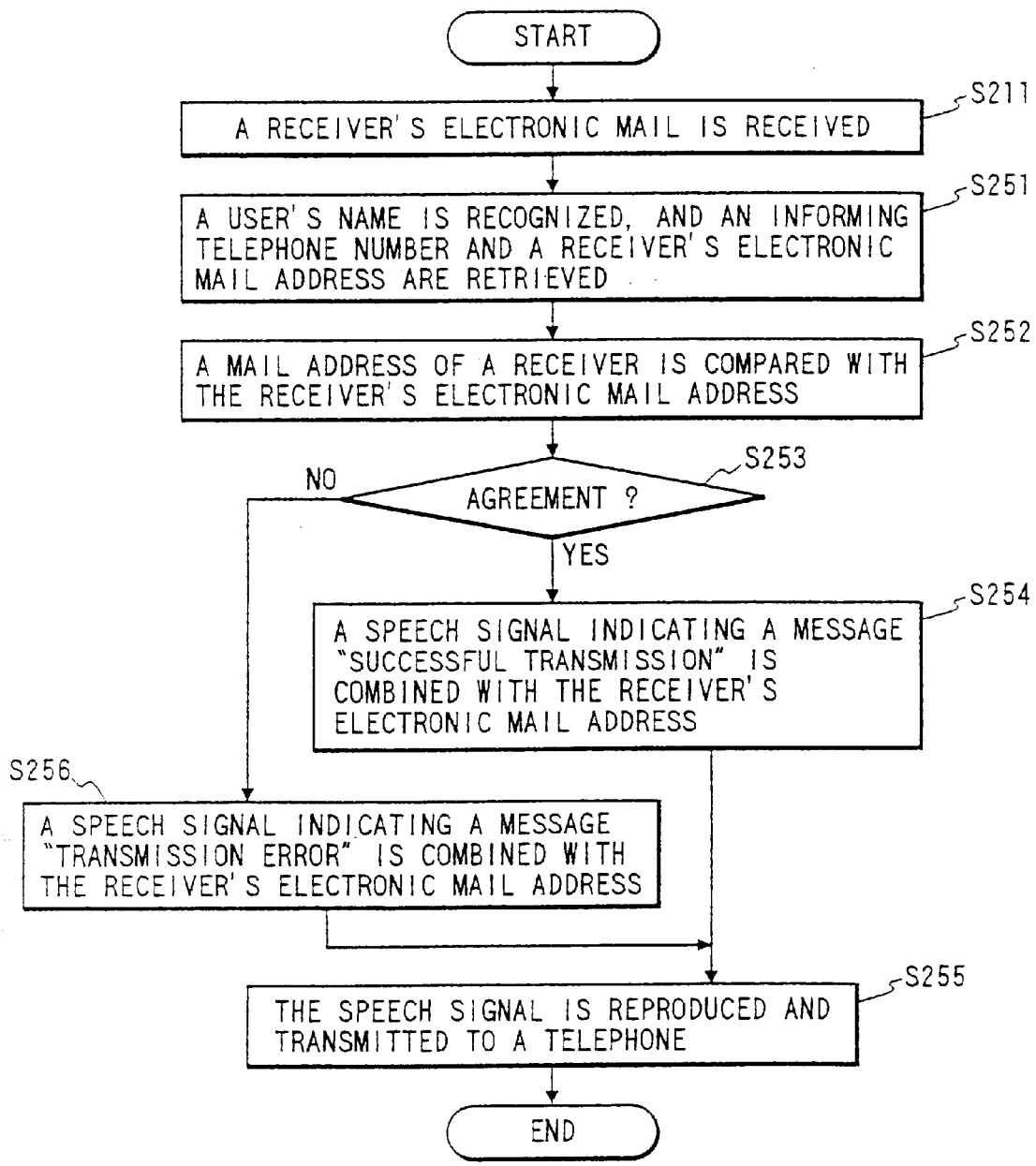

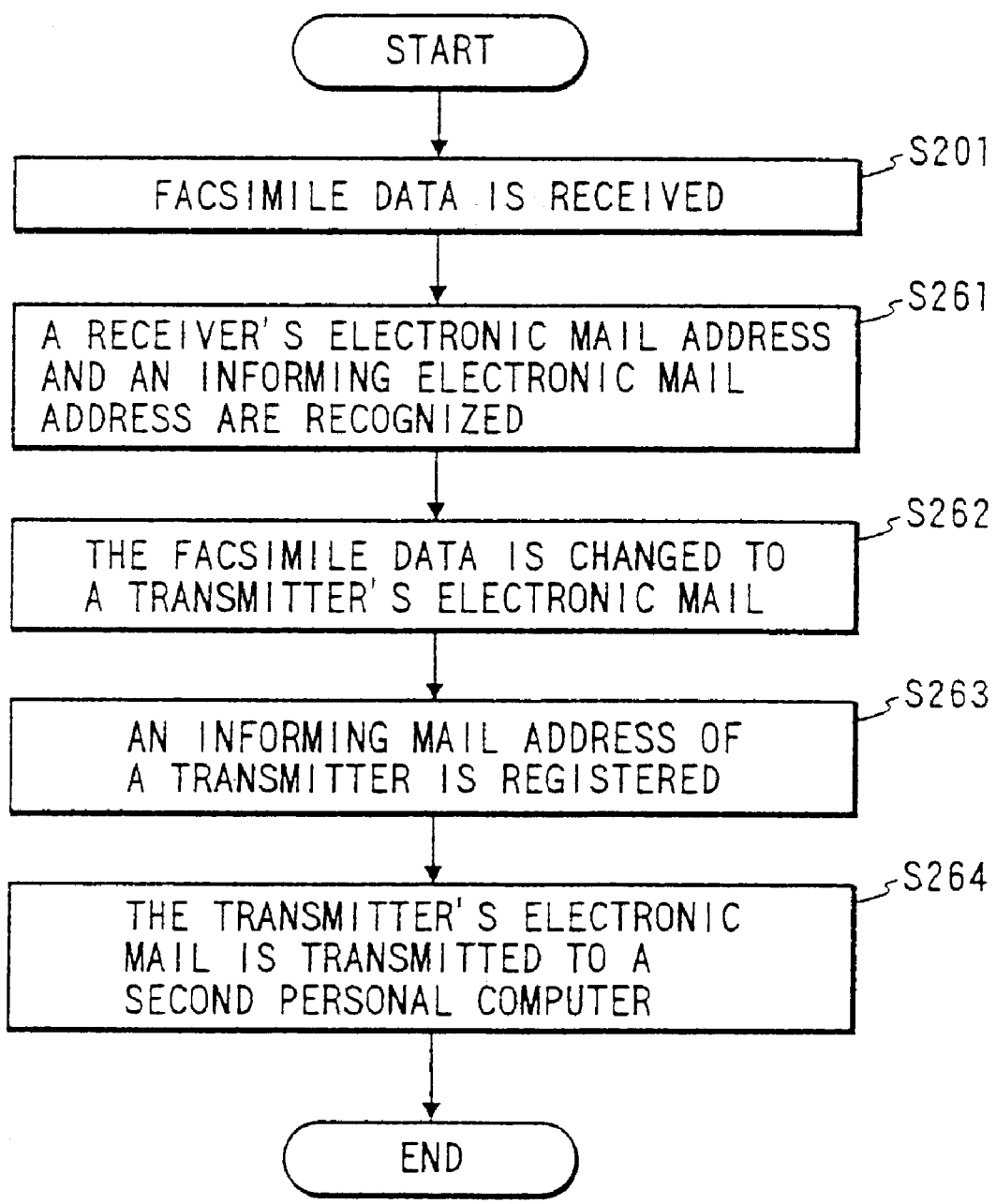

IMAGE COMMUNICATING METHOD, FACSIMILE TYPE ELECTRONIC MAIL APPARATUS AND FACSIMILE APPARATUS

This application is a Divisional of application Ser. No. 08/734,321 filed Oct. 21, 1996.

BACKGROUND OF THE INVENTION

1. Field of the Invention

The present invention relates to an image communicating method in which an image data communication is performed between an electronic mail apparatus and a facsimile apparatus, a facsimile type electronic mail apparatus in which a text obtained in an electronic computer originated mail is processed in the facsimile apparatus, and a facsimile apparatus in which facsimile data received in a facsimile is transmitted to an electronic mail apparatus.

2. Description of the Related Art

An apparatus installed in an office has been recently connected with a local area network (LAN) to efficiently conduct business. For example, a facsimile is connected to the LAN to use the facsimile as a printer. Also, a text or letter prepared in a personal computer is transmitted to a facsimile through the LAN. In a Published Unexamined Japanese Patent Application No. H7-143309 (1995), an apparatus in which a text prepared in a personal computer is transmitted by an electronic computer originated mail (hereinafter, called an electronic mail) to a facsimile apparatus through an LAN is proposed.

Also, a facsimile apparatus in which a facsimile is connected with the LAN and image data transmitted from the facsimile is transmitted to a destination by an electronic mail through the LAN is proposed. As an example, a facsimile apparatus connecting an integrated services digital network (ISDN) and an LAN is proposed in a Published Unexamined Japanese Patent Application No. H6-164645 (1994), and image data transmitted through the ISDN is transmitted to an address of an electronic mail indicated by a sub-address of the ISDN.

2.1. Previously Proposed Art

FIG. 1 is a block diagram of a conventional facsimile apparatus in which an electronic mail is utilized.

As shown in FIG. 1, a facsimile apparatus 100 is composed of a central processing unit (CPU) 101 for controlling the facsimile apparatus 100, a read only memory (ROM) 102 for storing a program, a random access memory (RAM) 103 for storing data used for the program, a panel unit 107 for inputting an instruction indicating the transmission of data, a LAN control unit 109 for controlling the transmission of text data to a LAN or the reception of text data from the LAN, a character-to-image converting unit 120 for converting the text data of an electronic mail transmitted through the LAN to image data, a compressing and expanding unit 108 for compressing or expanding the image data obtained by the character-to-image converting unit 120, a facsimile communicating unit 113 for transmitting the image data compressed by the compressing and expanding unit 108 to a telephone line or receiving image data from the telephone line, a scanning unit 111 for reading a manuscript to obtain image data, and a printing unit 110 for printing the image data obtained by the character-to-image converting unit 120 or the scanning unit 111.

In the above configuration of the facsimile apparatus 100, an operation for receiving an electronic mail and transmitting the electronic mail to a facsimile is described.

When an electronic mail transmitted through the LAN is received by the LAN control unit 109, a text of the electronic mail is converted into image data by the character-to-image converting unit 120, and the image data is compressed by the compressing and expanding unit 108. Thereafter, a facsimile number written in a destination box of the electronic mail is read out by the facsimile communicating unit 113, and the compressed image data is transmitted from the facsimile. communicating unit 113 to an address indicated by the facsimile number through the telephone line.

FIG. 2 is a block diagram of a conventional facsimile apparatus in which facsimile data received through a telephone line is transmitted to an address of an electronic mail.

As shown in FIG. 2, a facsimile apparatus 120 is composed of a CPU 121 for controlling the facsimile apparatus 120, a ROM 122 for storing a program, a RAM 123 for storing data used for the program, a facsimile data receiving and transmitting unit 124 for receiving facsimile data transmitted through a telephone line or transmitting facsimile data to the telephone line, a format converting unit 125 for converting a format in the facsimile data received by the facsimile data receiving and transmitting unit 124 to a format of an electronic mail to obtain electronic mail data, and an LAN controlling unit 126 for receiving an electronic mail transmitted through an LAN or transmitting the electronic mail data obtained in the format converting unit 125.

In the above configuration of the facsimile apparatus 120, when facsimile data transmitted from a transmitting side through the telephone line is received in the facsimile data receiving and transmitting unit 124, an address of an electronic mail is retrieved according to a number of a sub-address of the ISDN by using a corresponding table of registered numbers and mail addresses, the facsimile data is converted to electronic mail data:by the format converting unit 125, and the electronic mail data is transmitted to a receiving side placed at the address of the electronic mail through the LAN controlling unit 126.

2.2. Problems to be Solved by the Invention

However, in the facsimile apparatus 100 according to a first prior art, because a text of the electronic mail is converted into the image data and is transmitted to a facsimile, in cases where a paper size treated on a transmitting side differs from that treated on a receiving side, the text of the electronic mail cannot be transmitted to the facsimile because a paper size adjustment cannot be performed.

Also, because any user can use the facsimile apparatus 100 as a relay unit relaying from the LAN to the facsimile, an owner of the facsimile apparatus 100 is required to pay a communication fee even though another person uses the facsimile apparatus 100 as a relay unit. Therefore, there is a probability that the facsimile apparatus 100 is against owner's interests.

Also, in cases where a transmission error occurs in the facsimile apparatus 100, a user who transmits an electronic mail to a facsimile cannot know the occurrence of the transmission error.

In the facsimile apparatus 120 according to a second prior art, in cases where a transmission error of the electronic mail occurs, the facsimile apparatus 120 cannot inform the facsimile of the transmitting side that the transmission error occurs. Therefore, a sender cannot know whether or not a manuscript read by the facsimile is correctly transmitted to the receiving side.

SUMMARY OF THE INVENTION

A first object of the present invention is to provide, with due consideration to the drawbacks of such a conventional facsimile apparatus, an image communicating method and a facsimile type electronic mail apparatus in which a communication between a transmitting side and a receiving side is performed even though a paper size treated on the transmitting side differs from that treated on the receiving side. Also, the first object is to provide an image communicating method in which the facsimile type electronic mail apparatus is not used by a person other than an owner without permission. Also, the first object is to provide an image communicating method and a facsimile type electronic mail apparatus in which a user who transmits an electronic mail to a facsimile can know the occurrent of a transmission error.

A second object of the present invention is to provide a facsimile apparatus which informs a transmitting side of the occurrence of a transmitting error in cases where the transmitting error of an electronic mail occurs.

The first object is achieved by the provision of an image communicating method, comprising the steps of:

producing image data indicating a particular image written in a particular paper of a particular paper size on a transmitting side;

transmitting the image data from the transmitting side to a receiving side by an electronic mail through an internet;

judging whether or not the particular paper size of the image data received on the receiving side is larger than a prescribed paper size treatable on the receiving side;

adjusting the image data on the receiving side to reproduce the particular image on a paper having the prescribed paper size in cases where the particular paper size is larger than the prescribed paper size; and printing the particular image on a prescribed paper of the prescribed paper size according to the adjusted image data on the receiving side.

The first object is also achieved by the provision of a facsimile type electronic mail apparatus, comprising:

reading means for reading a particular image written in a particular paper of a particular paper size on a transmitting side to produce image data at a particular image resolution;

transmitting and receiving means for transmitting the image data produced by the reading means by an electronic mail on the transmitting side and receiving the image data through an internet on a receiving side;

judging means for judging whether or not the particular paper size of the image data received by the transmitting and receiving means is larger than a prescribed paper size treatable on the receiving side;

adjusting means for adjusting the image data on the receiving side to produce adjusted image data indicating a downsized particular image reproducible on a paper of the prescribed paper size in cases where it is judged by the judging means that the particular paper size is larger than the prescribed paper size; and printing means for printing the downsized particular image on a prescribed paper of the prescribed paper size according to the adjusted image data produced by the adjusting means on the receiving side.

In the above steps or the configuration, even though the particular paper size of a paper used on the transmitting side cannot be treated on the receiving side, because the image data is adjusted to reproduce the particular image on a paper having a prescribed paper size treatable on the receiving side, the particular image can be printed on a prescribed paper having the prescribed paper size.

The first object is also achieved by the provision of an image communicating method, comprising the steps of:

communicating between a transmitting side and a receiving side through an internet to transmit a prescribed page size treatable on the receiving side from the receiving side to the transmitting side;

judging whether or not a particular paper size of a particular paper used on the transmitting side is larger than the prescribed paper size;

optically downsizing a particular image written in the particular paper on the transmitting side to reproduce the particular image on a paper of the prescribed paper size in cases where the particular paper size is larger than the prescribed paper size;

producing image data indicating the downsized particular image on the transmitting side;

transmitting the image data from the transmitting side to the receiving side by an electronic mail through the internet; and printing the particular image on a prescribed paper of the prescribed paper size according to the image data on the receiving side.

The first object is also achieved by the provision of a facsimile type electronic mail apparatus, comprising:

control means for controlling the communication between a transmitting side and a receiving side through an internet to transmit a prescribed page size treatable on the receiving side from the receiving side to the transmitting side and judging whether or not a particular paper size of a particular paper used on the transmitting side is larger than the prescribed paper size;

image downsizing means for optically downsizing a particular image of a manuscript written in the particular paper on the transmitting side to produce a downsized image reproducible on a paper of the prescribed paper size in cases where it is judged by the control means that the particular paper size is larger than the prescribed paper size;

reading means for reading the downsized image to produce image data indicating the downsized image on the transmitting side;

transmitting and receiving means for transmitting the image data produced by the reading means by an electronic mail on the transmitting side and receiving the image data through an internet on a receiving side; and printing means for printing the downsized image on a prescribed paper of the prescribed paper size on the receiving side according to the image data transmitted by the transmitting and receiving means.

In the above steps or configuration, a prescribed page size treatable on the receiving side is transmitted to the transmitting side in advance, and a particular image written in a particular paper of a particular paper size is optically downsized on the transmitting side to reproduce the particular image on a paper of the prescribed paper size. Therefore, even though the particular paper size cannot be treated on the receiving side, the particular image can be reproduced on the receiving side.

The first object is also achieved by the provision of an image communicating method, comprising the steps of:

inputting a pass-word corresponding to a receiving side on a transmitting side;

ciphering the pass-word on the transmitting side;

producing image data indicating a particular image written in a particular paper on the transmitting side;

adding the ciphered pass-word to the image data on the transmitting side;

transmitting the image data from the transmitting side to the receiving side by an electronic mail through an internet;

deciphering the ciphered pass-word added to the image data eon the receiving sid;

judging on the receiving side whether or not the deciphered pass-word agrees with a prescribed pass-word peculiar to the receiving side; and transmitting the image data to a facsimile to reproduce the particular image in cases where the deciphered pass-word agrees with the prescribed pass-word.

The first object is also achieved by the provision of a facsimile type electronic mail apparatus, comprising:

inputting means for inputting a pass-word corresponding to a receiving side on a transmitting side;

reading means for reading a particular image written in a particular paper of a particular paper size to produce image data indicating the particular image on the transmitting side;

ciphering means for ciphering the pass-word input by the inputting means on the transmitting side to produce a ciphered pass-word and adding the ciphered pass-word to the image data produced by the reading means on the transmitting side;

transmitting and receiving means for transmitting the image data produced by the reading means by an electronic mail on the transmitting side and receiving the image data through an internet on a receiving side;

deciphering means for extracting the ciphered pass-word added to the image data and deciphering the ciphered pass-word on the receiving side to produce a deciphered pass-word;

judging means for judging on the receiving side whether or not the deciphered pass-word agrees with a prescribed pass-word peculiar to the receiving side; and facsimile communicating means for transmitting the image data received by the transmitting and receiving means to a facsimile to reproduce the particular image in cases where it is judged by the judging means that the deciphered pass-word agrees with the prescribed pass-word.

In the above steps or configuration, because the ciphered pass-word is transmitted from the transmitting side to the receiving side and the facsimile transmission of the image data is performed in cases where the deciphered pass-word agrees with a prescribed pass-word peculiar to the receiving side, there is no probability that the facsimile transmission is performed for a wrong purpose by an unspecified person to be against owner's interests.

The first object is also achieved by the provision of an image communicating method, comprising the steps of:

inputting print data which is reproducible in a particular paper and is transmitted from a terminal to a transmitting side through a local area network;

inserting both an electronic mail address indicating an error information receiving apparatus and a facsimile number indicating a facsimile into the print data on the transmitting side;

transmitting the print data from the transmitting side to a receiving side through an internet;

analyzing the print data on the receiving side to extract the facsimile number;

transmitting the print data to the facsimile indicated by the facsimile number to output the print data;

judging whether or not an error occurs in the transmission of the print data to the facsimile;

analyzing the print data on the receiving side to extract the electronic mail address in cases where an error occurs in the transmission of the print data to the facsimile; and informing the error information receiving apparatus indicated by the electronic mail address that the error occurs, by an electronic mail through the local net work.

The first object is also achieved by the provision of a facsimile type electronic mail apparatus, comprising:

inputting means for inputting print data which is reproducible in a particular paper and is transmitted from a terminal to a transmitting side through a local area network;

inserting means for inserting both an electronic mail address indicating an error information receiving apparatus and a facsimile number indicating a facsimile into the print data prepared by the preparing means on the transmitting side;

transmitting and receiving means for transmitting the print data, in which the electronic mail address and the facsimile number are inserted by the inserting means, by an electronic mail on the transmitting side and receiving the print data through an internet on a receiving side;

print data analyzing means for analyzing the print data received by the transmitting and receiving means on the receiving side to extract the facsimile number and the electronic mail address from the print data;

facsimile communicating means for transmitting the print data to the facsimile, which is indicated by the facsimile number extracted by the print data analyzing means, to output the print data;

control means for judging whether or not an error occurs in the transmission of the print data performed by the facsimile communicating means and informing the error information receiving apparatus, which is indicated by the electronic mail address extracted by the print data analyzing means, of the occurrence of an error by an electronic mail through the local net work in cases where the error occurs in the transmission of the print data to the facsimile.

In the above steps or configuration, the print data prepared by using a terminal such as a personal computer can be transmitted to the facsimile through the transmitting and receiving sides. Also, even though an error occurs in the facsimile transmission, the occurrence of the error can be immediately informed the error information receiving apparatus by an electronic mail.

The second object is achieved by the provision of a facsimile apparatus, comprising:

facsimile data receiving means for receiving facsimile data from a facsimile of a transmitter;

recognizing means for recognizing identification information of the transmitter and a receiver's electronic mail address which are written in the facsimile data received by the facsimile data receiving means;

mail address generating means for generating a transmitter's electronic mail address uniquely specifying the transmitter;

storing means for storing a set of the transmitter's electronic mail address generated by the mail address generating means, the identification information of the transmitter recognized by the recognizing means and the receiver's electronic mail address recognized by the recognizing means in correspondence to each other;

first changing means for changing the facsimile data received by the facsimile data receiving means to a transmitter's electronic mail and inserting the transmitter's electronic mail address generated by the mail address generating means into the transmitter's electronic mail;

electronic mail transmitting and receiving means for transmitting the transmitter's electronic mail changed by the first changing means to a receiver specified by the receiver's electronic mail address recognized by the recognizing means through an internet and receiving a receiver's electronic mail which denotes a reply or error information for the transmitter's electronic mail and is transmitted from the receiver to the transmitter's electronic mail address inserted into the transmitter's electronic mail through the internet;

reading means for reading the identification information of the transmitter from the storing means according to the transmitter's electronic mail address of the receiver's electronic mail received by the electronic mail transmitting and receiving means;

second changing means for changing the receiver's electronic mail received by the electronic mail transmitting and receiving means to receiver's facsimile data; and facsimile data transmitting means for transmitting the receiver's facsimile data changed by the second changing means to the facsimile of the transmitter specified by the identification information of the transmitter read by the reading means.

In the above configuration, a transmitter prepares facsimile data in which identification information specifying the transmitter and a receiver's electronic mail address are included. Thereafter, when the facsimile data is received by the facsimile data receiving means, the identification information and the receiver's electronic mail address are recognized by the recognizing means, and a transmitter's electronic mail address is generated by the mail address generating means. Also, a set of the transmitter's electronic mail address, the identification information and the receiver's electronic mail address is stored in the storing means in correspondence to each other. Thereafter, the facsimile data is changed to a transmitter's electronic mail by the first changing means and the transmitter's electronic mail address is inserted into the transmitter's electronic mail, and the transmitter's electronic mail is transmitted to a receiver specified by the receiver's electronic mail address through an internet.

Thereafter, when a receiver's electronic mail transmitted from the receiver to the transmitter's electronic mail address as a reply or error information for the transmitter's electronic mail is received by the electronic mail transmitting and receiving means, the identification information of the transmitter is read from the storing means according to the transmitter's electronic mail address by the reading means, the receiver's electronic mail is changed to receiver's facsimile data by the second changing means, and the receiver's facsimile data is transmitted to the transmitter specified by the identification information of the transmitter by the facsimile data transmitting means.

Accordingly, even though an error occurs in the transmission of the transmitter's electronic mail, the error can be reliably informed the transmitter because the transmitter's electronic mail address is generated by the mail address generating means and the transmitter is uniquely specified by the transmitter's electronic mail address.

The second object is also achieved by the provision of a facsimile apparatus, comprising:

facsimile data receiving means for receiving facsimile data from a facsimile of a transmitter;

recognizing means for recognizing a transmitter's electronic mail address and a receiver's electronic mail address which are written in the facsimile data received by the facsimile data receiving means;

changing means for changing the facsimile data received by the facsimile data receiving means to a transmitter's electronic mail and inserting the transmitter's electronic mail address recognized by the recognizing means into the. transmitter's electronic mail; and electronic mail transmitting means for transmitting the transmitter's electronic mail changed by the changing means to a receiver specified by the receiver's electronic mail address recognized by the recognizing means through an internet to receive a receiver's electronic mail denoting a reply or error information for the transmitter's electronic mail in a terminal unit specified by the transmitter's electronic mail address inserted into the transmitter's electronic mail address by the changing means.

In the above configuration, because a transmitter's electronic mail having a transmitter's electronic mail address is transmitted to the receiver, the receiver can directly send a receiver's electronic mail denoting a reply or error information for the transmitter's electronic mail to a terminal unit of the transmitter.

BRIEF DESCRIPTION OF THE DRAWINGS

The objects, features and advantages of the present invention will be apparent from the following description taken in conjunction with the accompanying drawings, in which:

FIG. 9 is a flow chart of an operation in which an image of a manuscript is optically downsized in the facsimile type electronic mail apparatus shown in FIG. 8 according to an image communicating method of the second embodiment;

FIG. 10 is a flow chart of an operation in which a prescribed paper size and a prescribed image resolution treatable on each of the receiving sides are registered in advance with the registration of a shortened number of each of the receiving sides according to an image communicating method of the third embodiment;

FIG. 11 is a flow chart of an operation in which an image of a manuscript is optically downsized according to the prescribed paper size and the prescribed image resolution on the transmitting side;

FIG. 31 is a flow chart showing an operation performed by the facsimile apparatus shown in FIG. 30 according to a fourteenth embodiment when a receiver's electronic mail transmitted from a personal computer of a receiver is returned to the facsimile apparatus; and FIG. 32 is a flow chart showing an operation performed by the facsimile apparatus shown in FIG. 22 according to a fifteenth embodiment when facsimile data is received in the facsimile apparatus.

DETAILED DESCRIPTION OF THE EMBODIMENTS

Preferred embodiments of an image communicating method, a facsimile type electronic mail apparatus and a facsimile apparatus according to the present invention are described with reference to drawings.

Figure 1:
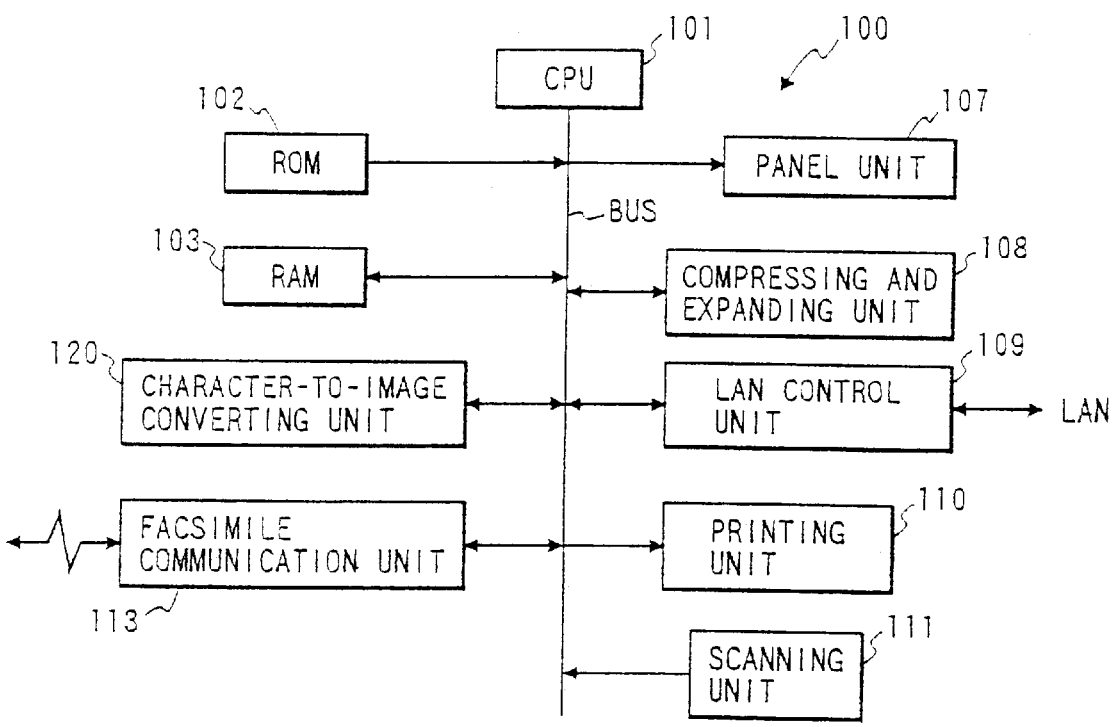
FIG. 1 is a block diagram of a conventional facsimile apparatus in which an electronic mail is utilized.
Figure 2:
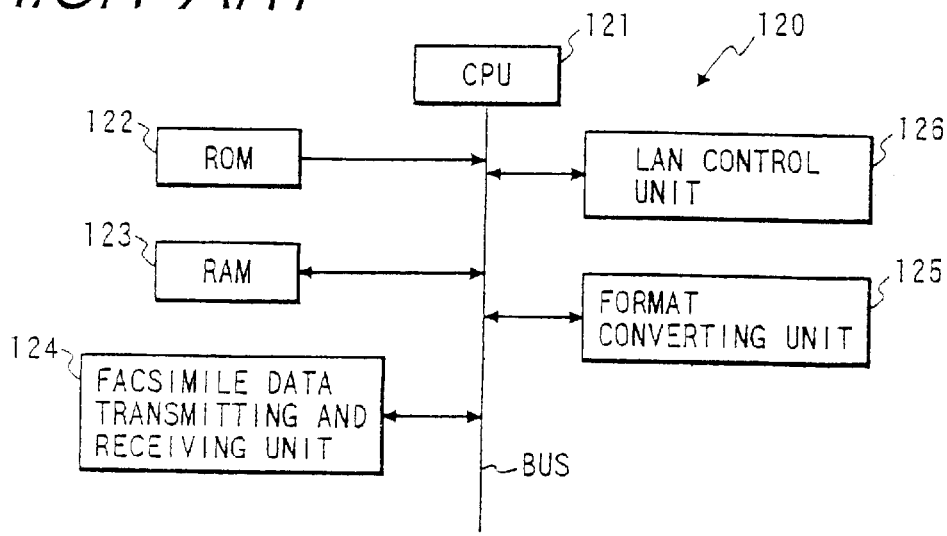
FIG. 2 is a block diagram of a conventional facsimile apparatus in which facsimile data received through a telephone line is transmitted to an address of an electronic mail.
Figure 3:
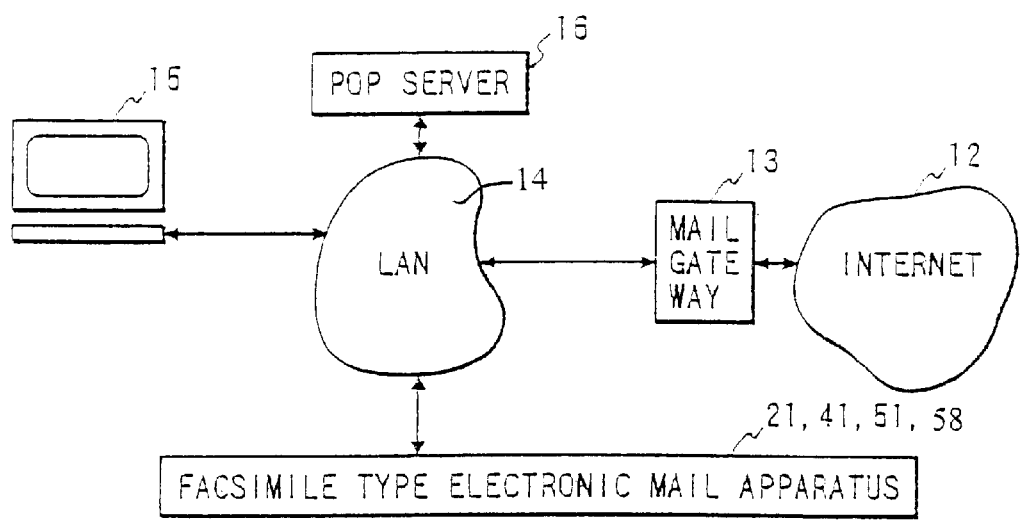
FIG. 3 is a conceptual view of operational circumstances in which a facsimile type electronic mail apparatus is operated.

FIG. 3 is a conceptual view of operational circumstances in which a facsimile type electronic mail apparatus is operated.

As shown in FIG. 3, a facsimile type electronic mail apparatus 21, 41, 51 or 58 according to first to seventh embodiments is operated in operational circumstances in which an electronic mail passing through an internet 12 is used. That is, a mail gate way 13 connects the internet 12 and a local area network (LAN) 14, and an electronic mail in the LAN 14 communicates with the internet 12. Also, the facsimile type electronic mail apparatus 21, 41, 51 or 58, a personal computer 15 and a post office protocol (POP) server 16 are respectively connected with the LAN 14. The electronic mail is transmitted according to a simple mail transfer protocol (SMTP). However, it is applicable that the electronic mail be transmitted according to a post office protocol (POP).

In following embodiments except for the seventh embodiment, a pair of facsimile type electronic mail apparatuses communicates with each other through the LAN 14 and the internet 12.

Figure 4:
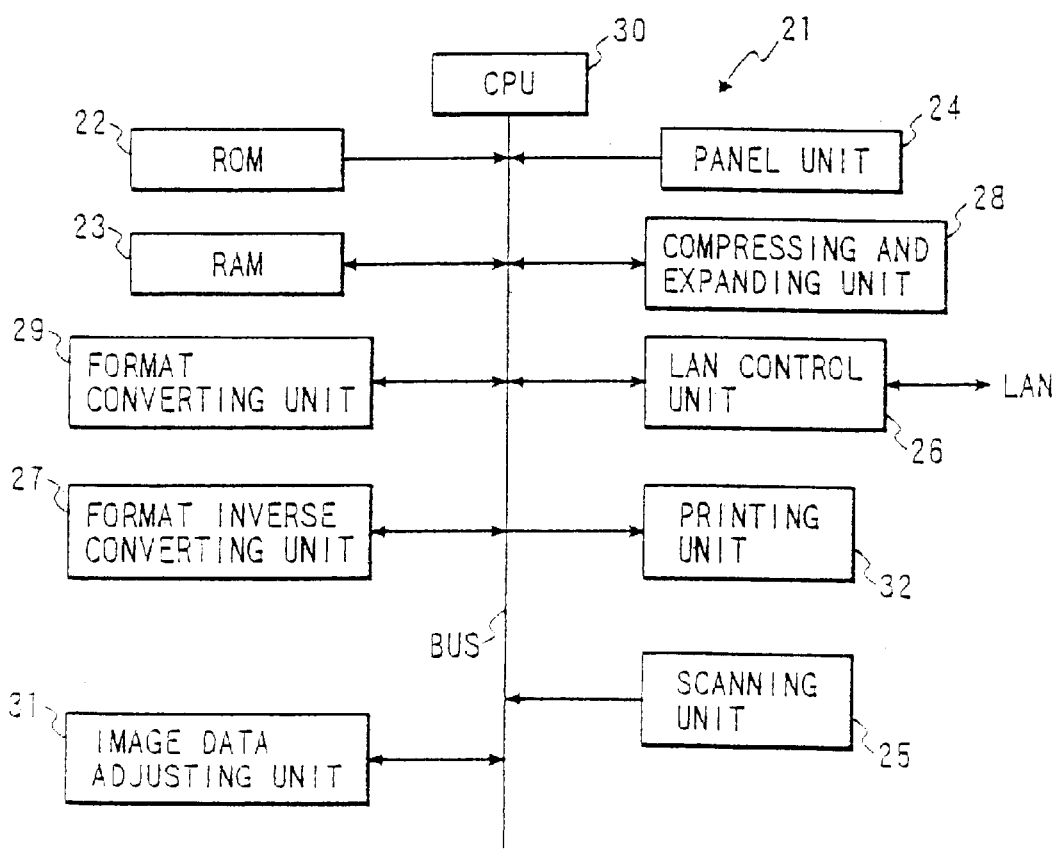
FIG. 4 is a block diagram of a facsimile type electronic mail apparatus used on a transmitting side or a receiving side according to a first embodiment of the present invention.

FIG. 4 is a block diagram of a facsimile type electronic mail apparatus used on a transmitting side or a receiving side according to a first embodiment of the present invention.

As shown in FIG. 4, a facsimile type electronic mail apparatus 21 comprises a ROM 22 for storing a program, a RAM 23 for storing data used for the execution of the program stored in the ROM 22, a panel unit 24 through which a user inputs a destination specifying the apparatus 21 of a receiving side, a scanning unit 25 for reading a particular image of a manuscript written in a paper having a particular paper size to obtain scanned image data indicating characters of the manuscript at a particular image resolution on a transmitting side, an LAN control unit 26 for transmitting the scanned image data processed on the transmitting side as mail data of an electronic mail to the receiving side and receiving the mail data transmitted from the transmitting side through the LAN 14 and the internet 12 on the receiving side, a format inverse converting unit 27 for converting a mail format of the mail data received by the LAN control unit 26 to an image format on the receiving side to change the received mail data to reproduced image data, a compressing and expanding unit 28 for compressing the scanned image data obtained in the scanning unit .25 on the transmitting side and expanding the reproduced image data obtained in the format inverse converting unit 27 on the receiving side, a format converting unit 29 for converting the image format of the scanned image data compressed by the compressing and expanding unit 28 to the mail format on the transmitting side to change the scanned image data to the mail data sent from the LAN control unit 26 by the electronic mail, a CPU 30 for controlling the transmission of the mail data and the reception of the mail data, adding the particular paper size and the particular image resolution to the mail data transmitted from the LAN control unit 26 on the transmitting side and judging whether or not both the particular paper size and the particular image resolution are treatable in the facsimile type electronic mail apparatus 21 of the receiving side, an image data adjusting unit 31 for adjusting the reproduced image data expanded by the compressing and expanding unit 28 on the receiving side to produce adjusted image data indicating a downsized image of the manuscript reproducible on a paper of a prescribed paper size at a prescribed image resolution in cases where it is judged that the particular paper size or the particular image resolution of the reproduced image data is not treatable in the facsimile type electronic mail apparatus 21.of the receiving side, and a printing unit 32 for printing out the particular image of the manuscript according to the reproduced image data expanded by the compressing and expanding unit 28 on the receiving side in cases where it is judged that both the particular paper size and the particular image resolution are treatable in the facsimile type electronic mail apparatus 21 of the receiving side and printing out the downsized image of the manuscript on a prescribed paper of the prescribed paper size at the prescribed image resolution according to the adjusted image data produced by the image data adjusting unit 31 on the receiving side in cases where it is judged that the particular paper size or the particular image resolution is not treatable in the facsimile type electronic mail apparatus 21 of the receiving side.

Figure 5:
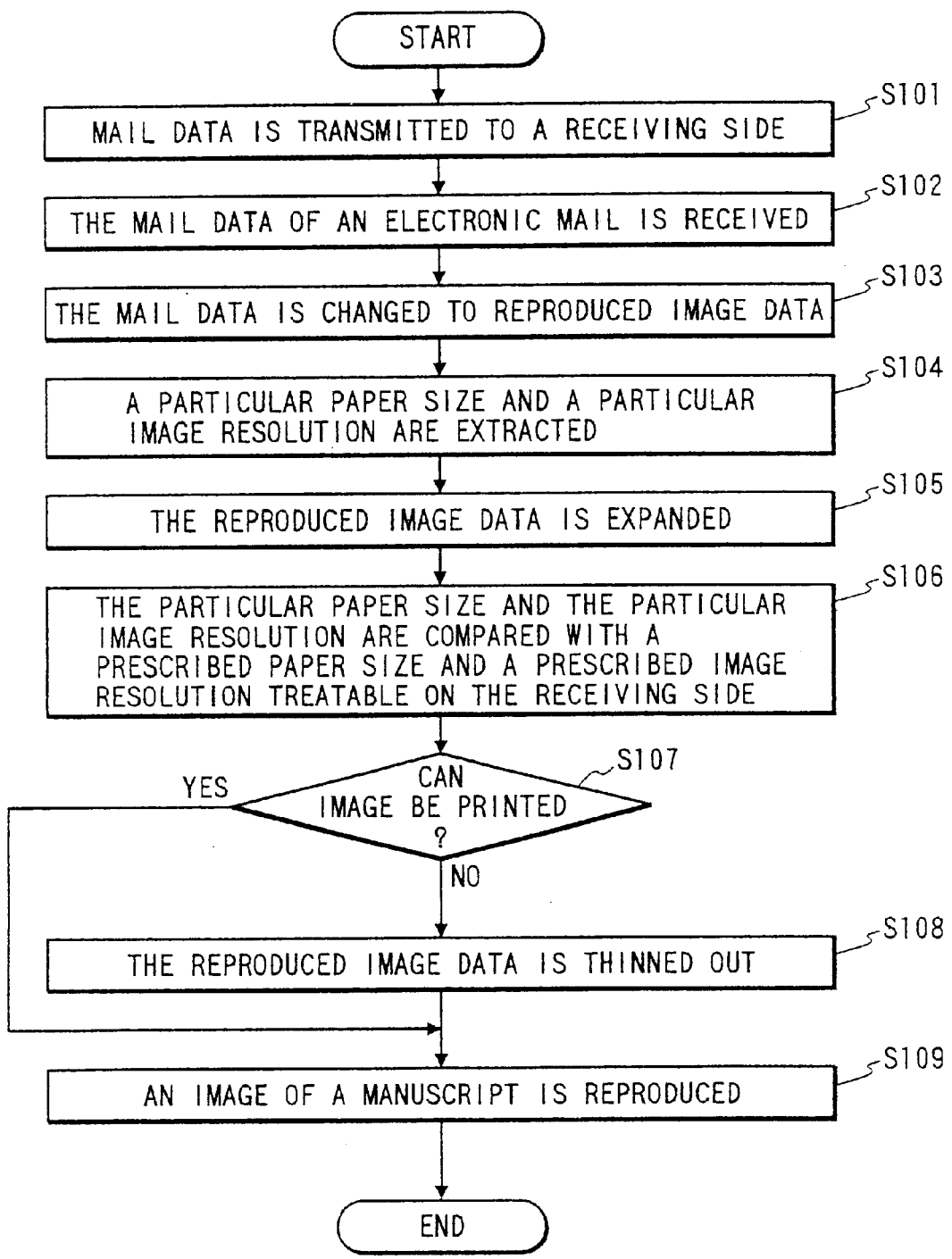
FIG. 5 is a flow chart of an operation in which a particular paper size for an image or a particular image resolution is adjusted according to an image communicating method of the first embodiment.

In the above configuration of the facsimile type electronic mail apparatus 21, an operation for receiving mail data transmitted from a transmitting side, producing image data from the mail data and adjusting a particular paper size required for an image expressed by the image data or a particular image resolution on a receiving side is described according to an image communicating method with reference to FIG. 5.

FIG. 5 is a flow chart of an operation in which a particular paper size for the image or a particular image resolution is adjusted according to an image communicating method of the first embodiment.

As shown in FIG. 5, scanned image data is obtained in the scanning unit 25 at a particular image resolution on the transmitting side by reading a manuscript written in a paper having a particular paper size, the particular paper size and the particular image resolution are added to the scanned image data, the scanned image data is compressed in the compressing and expanding unit 28, an image format of the scanned image data is converted into a mail format in the format converting unit 29 to change the scanned image data to mail data, and the mail data is transmitted from the LAN control unit 26 of the transmitting side to the LAN control unit 26 of the receiving side through the LAN 14 by an electronic mail (step S101).

When the mail data of the electronic mail is received on the receiving side (step S102), the mail format of the mail data is converted into the image format in the format inverse converting unit 27 to change the mail data to reproduced image data (step S103). The operation in the format converting unit 29 and the operation in the format inverse converting unit 27 are described later in detail. Thereafter, the particular paper size and the particular image resolution are extracted from the reproduced image data in the CPU 30 (step S104), the reproduced image data is expanded in the compressing and expanding unit 28 (step 5105), and the particular paper size and the particular image resolution are compared in the CPU 30 with a prescribed paper size and a prescribed image resolution treatable in the apparatus 21 of the receiving side (step S106). Thereafter, it is judged by the CPU 30 whether or not the image expressed by the reproduced image data can be printed out at the particular paper size and the particular image resolution in the apparatus 21 of the receiving side (step S107). In cases where the prescribed paper size is larger than the prescribed paper size, because the image expressed by the reproduced image data cannot be printed out at the particular paper size, the reproduced image data is thinned out in the image data adjusting unit 31 to print out the reproduced image data at the prescribed paper size (step S108). Also, in cases where the particular image resolution is higher than the prescribed image resolution, because the image of the manuscript cannot be reproduced at the particular image resolution, the particular image resolution is lowered in the image data adjusting unit 31 by thinning out the reproduced image data (step S108). Thereafter, the reproduced image data is printed out by the printing unit 32 to reproduce an image of the manuscript (step S109) at the prescribed paper size and the prescribed image resolution. For example, in cases where the resolution of the image expressed by the reproduced image data is 400 dots per inches (DPI) higher than the prescribed image resolution of 200 DPI and the particular paper size for the image expressed by the reproduced image data is larger than the prescribed paper size, the reproduced image data is thinned out in the image data adjusting unit 31 to set the reproduced image data at the prescribed image resolution, and the reproduced image data is again thinned out to downsize the particular paper size to the prescribed paper size.

Therefore, because the particular paper size and the particular image resolution are judged in correspondence to each other, the reproduced image data can be processed to reproduce an image of the manuscript at the highest paper size and resolution treatable in the apparatus 21.

Figures 6, 7:
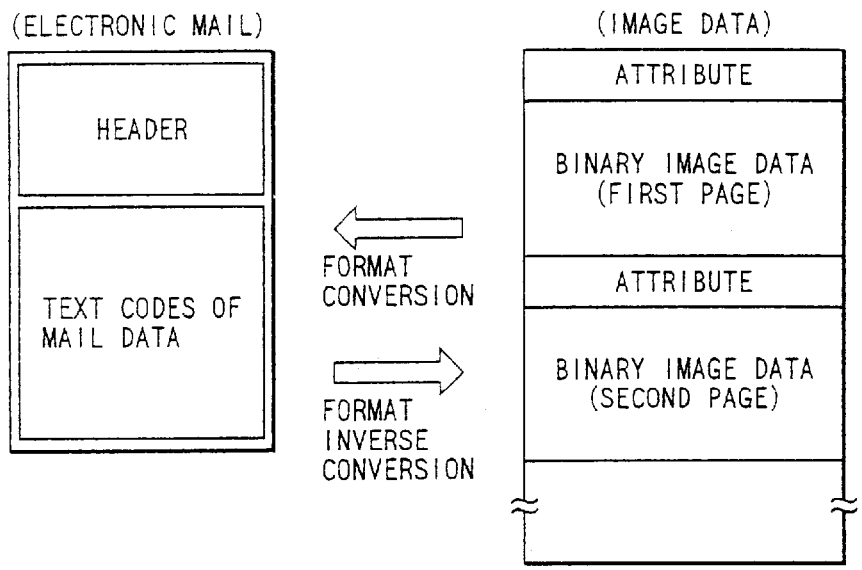
FIG. 6 shows a relationship of mail data obtained in a format converting unit shown in FIG. 4 and image data obtained in a format inverse converting unit shown in FIG. 4.
FIG. 7 shows an example of a header of an electronic mail.

FIG. 6 shows a relationship of the mail data obtained in the format converting unit 29 and the image data obtained in the format inverse converting unit 27.

As shown in FIG. 6, the image data for each page is composed of attributes such as a paper size, an image resolution, the number of bytes for one page and a pointer (an address in a memory) to a next page and compressed binary image data for one page. The mail data is composed of a header of the electronic mail and text codes obtained by converting the compressed binary image data. Because the binary data cannot be treated by the simple mail transfer protocol of the electronic mail, the image data (an attribute area and a binary data area) is converted into the text codes according to a prescribed algorithm. Also, an information volume of the mail data is larger than that of the image data because the information volume is increased when the binary image data is converted into the text codes.

FIG. 7 shows an example of a header of the electronic mail. As shown in FIG. 7, "MIME" written on a top line denotes a multi-purpose internet mail extensions. Therefore, image and speech can be treated in the electronic mail as well as a text. Also, a text section and an image section are placed at lower portions in that order, and the image data are finally added as the mail data.

Accordingly, even though a paper size treatable on the receiving side differs from that treatable on the transmitting side, because a size of an image expressed by the image data is made small on the receiving side, the image data can be set from the transmitting side to the receiving side by the electronic mail.

Next, a second embodiment in which an image of a manuscript is optically downsized on a transmitting side before the manuscript is read by a scanner is described.

Figure 8:
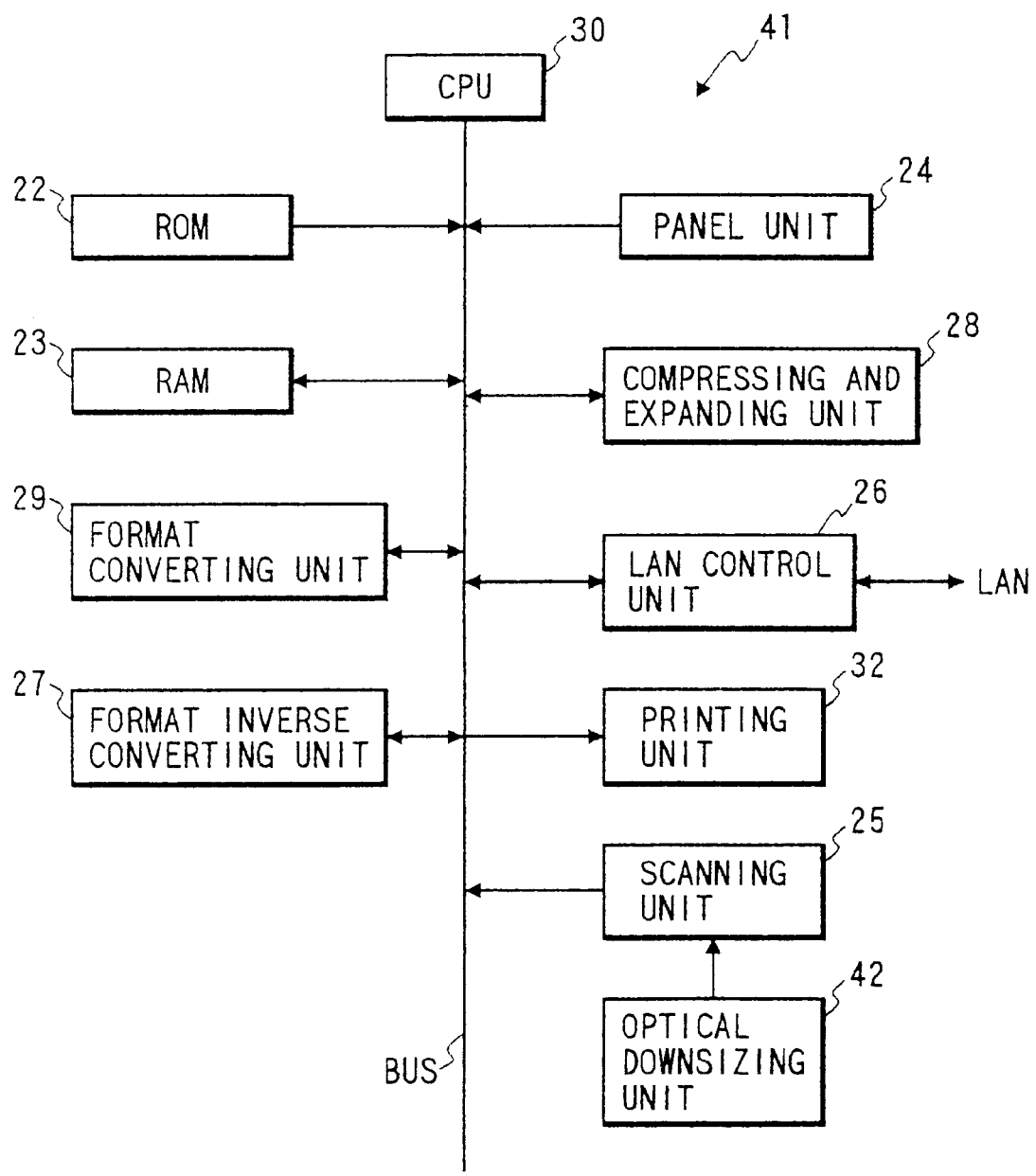
FIG. 8 is a block diagram of a facsimile type electronic mail apparatus used on a transmitting side or a receiving side according to second and third embodiments of the present invention.

FIG. 8 is a block diagram of a facsimile type electronic mail apparatus used on a transmitting side or a receiving side according to second and third embodiments of the present invention.

As shown in FIG. 8, a facsimile type electronic mail apparatus 41 comprises the ROM 22, the RAM 23, the panel unit 24, the scanning unit 25, the LAN control unit 26, the format inverse converting unit 27, the compressing and expanding unit 28, the format converting unit 29, the CPU 30, the image data adjusting unit 31, the printing unit 32, and an optical downsizing unit 42 for optically downsizing an image of a manuscript planned to be read by the scanning unit 25 in cases where a set of a paper size and an image resolution treatable on the transmitting side is not treatable on the receiving side.

In the above configuration of the facsimile type electronic mail apparatus 41, an operation for reading a manuscript on a transmitting side while downsizing an image of the manuscript if necessary and transmitting mail data expressing an image of the manuscript to a receiving side is described according to an image communicating method with reference to FIG. 9.

FIG. 9 is a flow chart of an operation in which an image of a manuscript is optically downsized in the facsimile type electronic mail apparatus 41 according to an image communicating method of the second embodiment.

As shown in FIG. 9, a paper in which a manuscript is written is set in the scanner unit 25, and a destination specifying the apparatus 41 of a receiving side is input to the panel unit 24 (step S121). Thereafter, the facsimile type electronic mail apparatus 41 of a transmitting side communicates with the apparatus 41 of the receiving side, and a prescribed paper size and a prescribed image resolution treatable in the apparatus 41 of the receiving side is transmitted from the apparatus 41 of the receiving side to the apparatus 41 of the transmitting side and is stored in the RAM 23 of the transmitting side (step S122). In this case, when a fire-wall is placed between the receiving and transmitting sides, because the transmitting side cannot be connected with only the receiving side, an electronic mail for asking about a prescribed paper size and a prescribed image resolution is transmitted from the transmitting side to the receiving side, and another electronic mail for informing about a prescribed paper size and a prescribed image resolution is returned from the receiving side to the transmitting side. In this transmission of the electronic mail, it takes a longer time than that in the direct communication between the transmitting and receiving sides.

Thereafter, it is judged in the CPU 30 of the receiving side whether or not an image of the manuscript planned to be scanned by the scanning unit 25 can be printed out at the prescribed paper size and the prescribed image resolution stored in the RAM 23 (step S123). In cases where an image of the manuscript cannot be printed out at the prescribed paper size and the prescribed image resolution on the receiving side, an image of the manuscript is optically downsized by the optical downsizing unit 42 on the transmitting side before the manuscript is scanned by the scanning unit 25 (step S124), and scanned image data is obtained in the scanning unit 25 on the transmitting side by reading the manuscript (step S125). In contrast, in cases where an image of the manuscript can be printed out at the prescribed paper size and the prescribed image resolution on the receiving side (step S123), scanned image data is obtained in the scanning unit 25 on the transmitting side by reading the manuscript without operating the optical downsizing unit 42 (step S125).

Thereafter, the scanned image data is compressed in the compressing and expanding unit 28 (step S126), an image format of the scanned image data is converted into a mail format in the format converting unit 29 to change the scanned image data to mail data (step S127), and the mail data is transmitted from the LAN control unit 26 of the transmitting side to the LAN control unit 26 of the receiving side through the LAN 14 by an electronic mail (step S128).

Thereafter, the mail data of the electronic mail is received on the receiving side, the mail format of the mail data is converted into the image format in the format inverse converting unit 27 to change the mail data to reproduced image data, the reproduced image data is expanded in the compressing and expanding unit 28, and the reproduced image data is printed out by the printing unit 32 to reproduce an image of the manuscript.

Accordingly, because the prescribed paper size and the prescribed image resolution treatable on the receiving side can be informed before the mail data expressing the image of the manuscript is transmitted from the transmitting side to the receiving side, the image of the manuscript can be optically downsized to be reproduced at the prescribed paper size and the prescribed image resolution on the receiving side. Therefore, the image of the manuscript can be reproduced on the receiving side at a high quality as compared with that in the apparatus 21 because of the optical downsizing of the image.

Next, a third embodiment in which a prescribed paper size and a prescribed image resolution treatable on each of the receiving sides are registered in advance with the registration of a shortened number of each of the receiving sides and an image of a manuscript is optically downsized on one transmitting side before the manuscript is read by a scanner is described.

FIG. 10 is a flow chart of an operation in which a prescribed paper size and a prescribed image resolution treatable on each of the receiving sides are registered in advance with the registration of a shortened number of each of the receiving sides in the facsimile type electronic mail apparatus 41 according to an image communicating method of the third embodiment.

As shown in FIG. 10, a shortened number of a destination specifying the apparatus 41 of a receiving side is input to the panel unit 24 (step S131). Thereafter, the facsimile type electronic mail apparatus 41 communicates with the destination by an electronic mail, and a prescribed paper size and a prescribed image resolution treatable on the apparatus 41 of the receiving side is transmitted from the receiving side to the transmitting side (step S132). Thereafter, the prescribed paper size and the prescribed image resolution are attached to the shortened number, and a set of the shortened number, the prescribed paper size and the prescribed image resolution is registered in the RAM 23 (step S133). Contents of the RAM 23 are back up by a buttery (not shown). The procedure of the steps S131 to S133 is performed for each of destinations.

FIG. 11 is a flow chart of an operation in which an image of a manuscript is optically downsized according to the prescribed paper size and the prescribed image resolution registered in the RAM 23 of the facsimile type electronic mail apparatus 41 on the transmitting side.

As shown in FIG. 11, a paper in which a manuscript is written is set in the scanner unit 25, and a particular shortened number of one destination is input to the panel unit 24 (step S134). Thereafter, a prescribed paper size and a prescribed image resolution attached to the particular shortened number are read out from the RAM 23 to the CPU 30 (step S135), it is judged in the CPU 30 whether or not an image of the manuscript planned to be scanned by the scanning unit 25 can be printed out at the prescribed paper size and the prescribed image resolution on the receiving side (step S136). In cases where an image of the manuscript cannot be printed out at the prescribed paper size and the prescribed image resolution on the receiving side, an image of the manuscript is optically downsized by the optical downsizing unit 42 on the transmitting side before the manuscript is scanned by the scanning unit 25 (step S137), and scanned image data is obtained in the scanning unit 25 on the transmitting side by reading the manuscript (step S138). In contrast, in cases where an image of the manuscript can be printed out at the prescribed paper size and the prescribed image resolution on the receiving side (step S136), scanned image data is obtained in the scanning unit 25 on,the transmitting side by reading the manuscript without operating the optical downsizing unit 42 (step S138).

Thereafter, the scanned image data is compressed in the compressing and expanding unit 28 (step S139), an image format of the scanned image data is converted into a mail format in the format converting unit 29 to change the scanned image data to mail data (step S140), and the mail data is transmitted from the LAN control unit 26 of the transmitting side to the LAN control unit 26 of the receiving side through the LAN 14 by an electronic mail (step S141). Thereafter, the mail data of the electronic mail is received on the receiving side, the mail format of the mail data is converted into the image format in the format inverse converting unit 27 to change the mail data to reproduced image data, the reproduced image data is expanded in the compressing and expanding unit 28, and the reproduced image data is printed out by the printing unit 32 to reproduce an image of the manuscript.

Accordingly, because a prescribed paper size and a prescribed image resolution treatable on a destination (or a receiving side) are registered in advance with the registration of a shortened number of the destination for each of destinations, a communication time required for communicating between the transmitting and receiving sides by transmitting an electronic mail can be omitted each time an image of the manuscript is transmitted from the transmitting side to the receiving side.

Next, a fourth embodiment in which a facsimile type electronic mail apparatus functions as a relay station for receiving mail data of an electronic mail, changing the mail data to facsimile data and transmitting the facsimile data to a facsimile is described.

Figure 12:
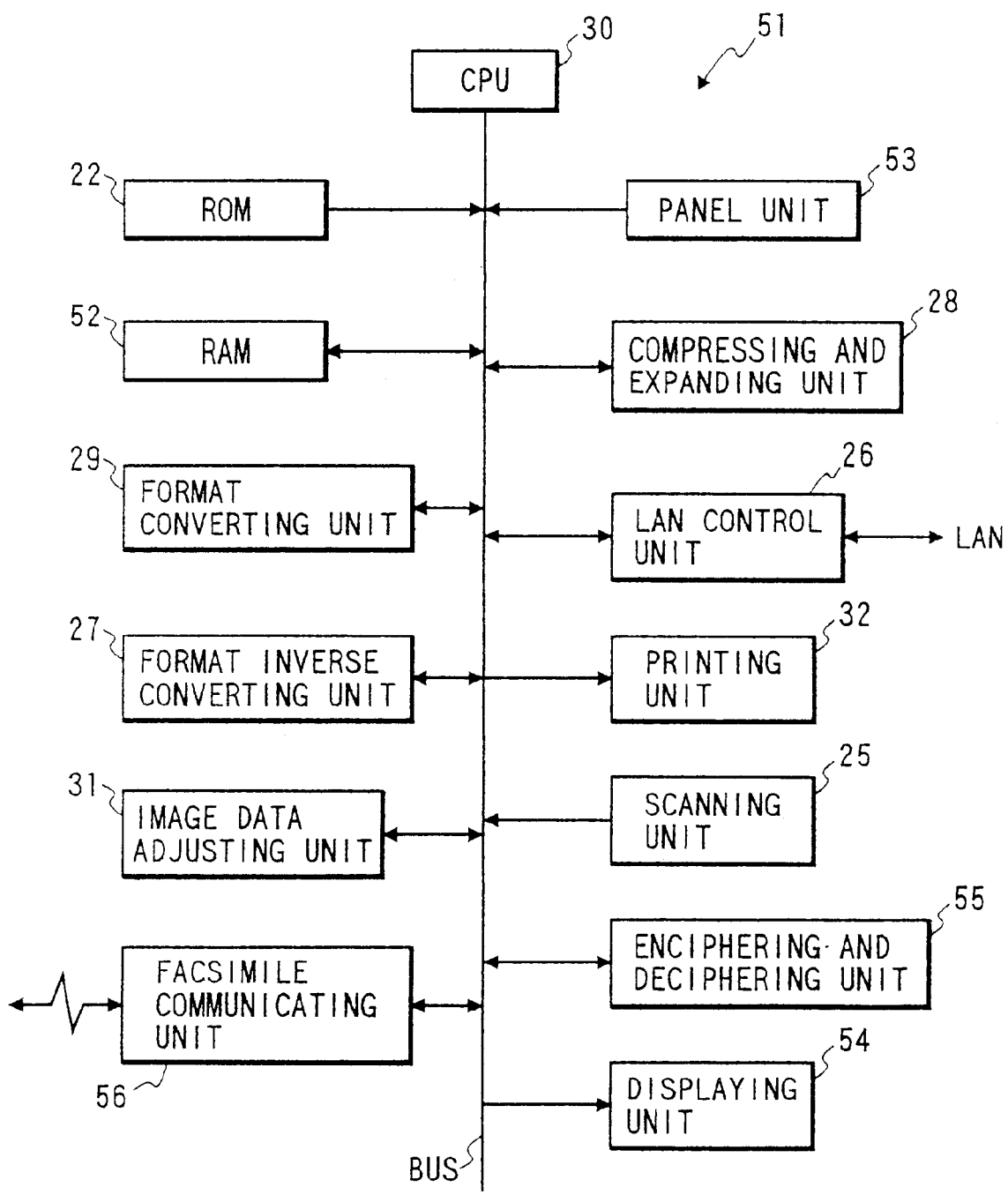
FIG. 12 is a block diagram of a facsimile type electronic mail apparatus functioning as a relay station according to fourth, fifth and sixth embodiments.

FIG. 12 is a block diagram of a facsimile type electronic mail apparatus functioning as a relay station according to fourth, fifth and sixth embodiments.

As shown in FIG. 12, a facsimile type electronic mail apparatus 51 comprises the ROM 22, a RAM 52 for storing data used for the execution of the program stored in the ROM 22 and storing a relay station list in which a number of a relay station, a mail address of the relay station, a pass-word of the relay station and a destination name (or an owner's name) of the relay station are listed for each of relay stations, a panel unit 53 for inputting a destination specifying the apparatus 21 of a receiving side as a relay station, a character stream instructing a facsimile transmission and a particular pass-word on the transmitting side, the scanning unit 25, the LAN control unit 26, the format inverse converting unit 27, the compressing and expanding unit 28, the format converting unit 29, the CPU 30, the image data adjusting unit 31, the printing unit 32, a displaying unit 54 for displaying the relay station list stored in the RAM 52 on the transmitting side, an enciphering and deciphering unit 55 for enciphering the particular pass-word input to the panel unit 53 on the transmitting side and deciphering the enciphered particular pass-word on the receiving side, and a facsimile communicating unit 56 for transmitting facsimile data obtained from the mail data to a particular facsimile through a telephone line on the receiving side.

In the above configuration of the facsimile type electronic mail apparatus 51, an operation in which an electronic mail is transmitted to a relay station is described with reference to FIG. 13.

Figures 13, 14:
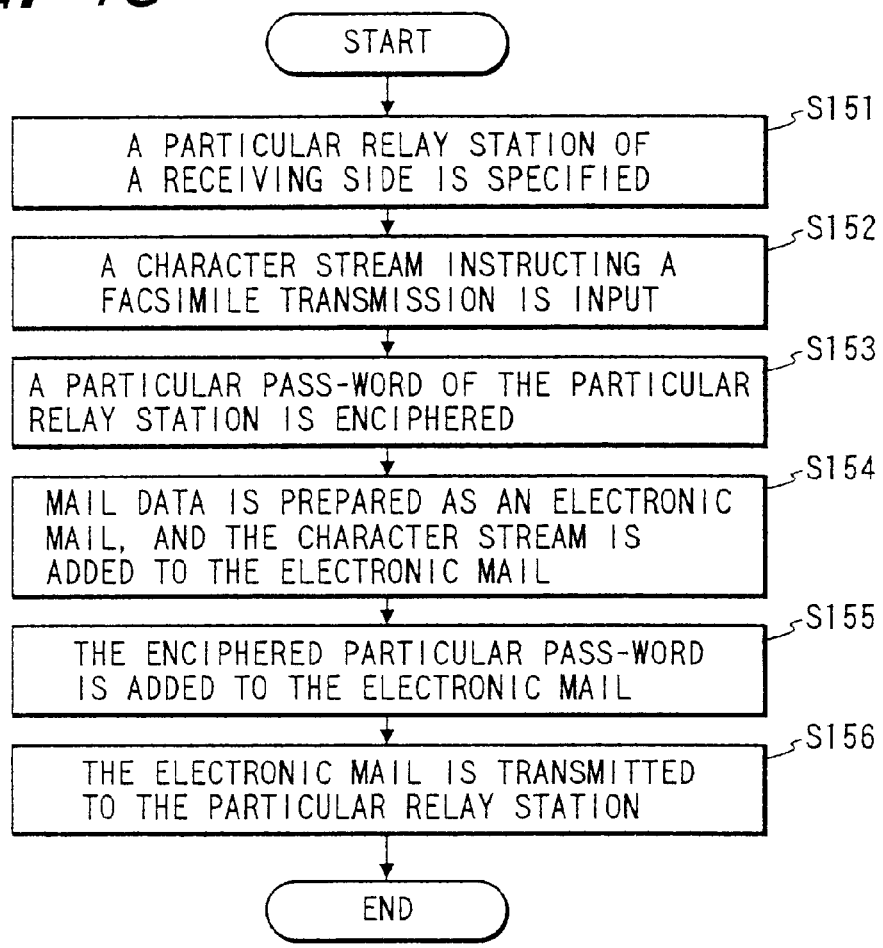
FIG. 13 is a flow chart of an operation in which mail data of an electronic mail prepared in the facsimile type electronic mail apparatus shown in FIG. 12 of a transmitting side is transmitted to the facsimile type electronic mail apparatus of a receiving side functioning as a relay station according to an image communicating method of the fourth embodiment.
FIG. 14 shows a relay station list stored in a RAM of the facsimile type electronic mail apparatus shown in FIG. 12.

FIG. 13 is a flow chart of an operation in which mail data of an electronic mail prepared in the facsimile type electronic mail apparatus 51 of a transmitting side is transmitted to the facsimile type electronic mail apparatus 51 of a receiving side functioning as a relay station according to an image communicating method of the fourth embodiment.

AS shown in FIG. 13, a paper in which a manuscript is written is set in the scanner unit 25 on a transmitting side, a relay station list stored in the RAM 52 is displayed on the displaying unit 54 on the transmitting side, a particular relay station corresponding to one facsimile type electronic mail apparatus 51 of a receiving side is selected, and a number of the particular relay station and a mail address of the particular relay station is input to the panel unit 53 on the transmitting side to specify the facsimile type electronic mail apparatus 51 of a receiving side as a particular relay station (step S151). An example of the relay station list is shown in FIG. 14. Thereafter, a character stream instructing a facsimile transmission is input to the panel unit 53 on the transmitting side (step S152). In this case, the character stream is, for example, composed of a word "relay" and a facsimile number designating a facsimile. Thereafter, a particular pass-word corresponding to the particular relay station is retrieved from the relay station list and is input to the panel unit 53 on the transmitting side, and the particular pass-word is enciphered by the enciphering and deciphering unit 55 (step S153).

Thereafter, image data is obtained in the scanning unit 25 and is processed in the compressing and expanding unit 28 and the format converting unit 29, and mail data obtained from the image data is prepared as an electronic mail in the LAN control unit 26 on the transmitting side in the same manner as in the first embodiment. Thereafter, the character stream input to the panel unit 53 is added to the electronic mail (step S154), and the particular pass-word enciphered by the enciphering and deciphering unit 55 is added to the electronic mail (step S155). As shown in FIG. 7, the character stream (for example, "relay 3491–9191") and the enciphered particular pass-word are placed in the text section of the electronic mail. Thereafter, the electronic mail is transmitted from the transmitting side to the particular relay station with the character stream and the enciphered particular pass-word (step S156).

Figure 15:
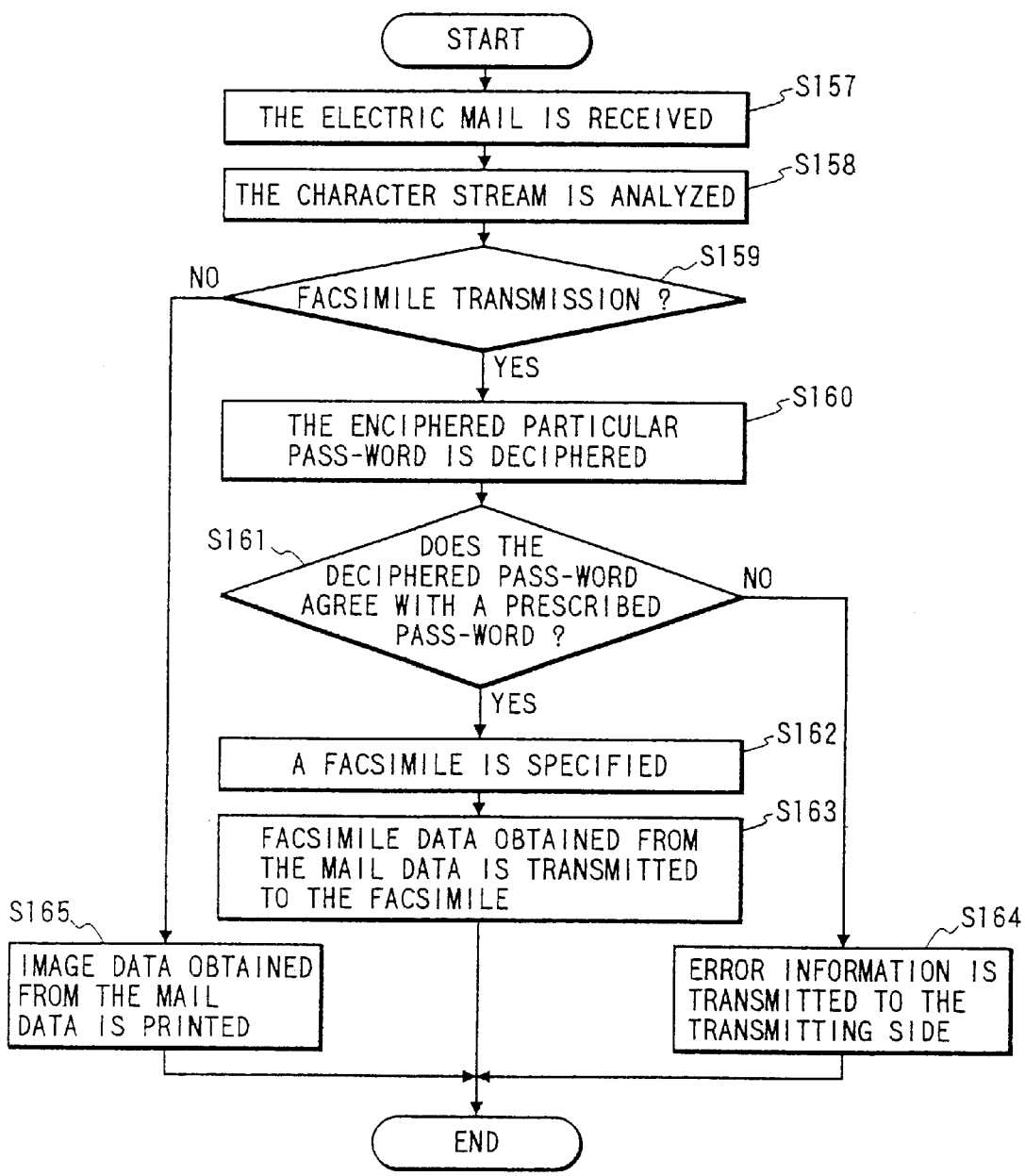
FIG. 15 is a flow chart of an operation in which a character stream transmitted from the transmitting side is analyzed and the electronic mail is transmitted to a facsimile according to the image communicating method of the fourth embodiment.

FIG. 15 is a flow chart of an operation in which the character stream transmitted from the transmitting side is analyzed and the electronic mail is transmitted to a facsimile according to the image communicating method of the fourth embodiment.

As shown in FIG. 15, when the electronic mail transmitted with the character stream and the enciphered particular pass-word is received in the LAN control unit 26 of the facsimile type electronic mail apparatus 51 functioning as the particular relay station (step S157), the character stream is analyzed in the CPU 30 (step S158), and it is judged whether or not the character stream indicates a facsimile transmission (step S159). In cases where a word "relay" is found out in this analysis, it is judged that the character stream indicates a facsimile transmission, and the enciphered particular pass-word placed at a predetermined position of the electronic mail is deciphered in the enciphering and deciphering unit 55 (step S160). Thereafter, it is judged in the CPU 30 whether or not the deciphered particular pass-word agrees with a prescribed pass-word registered by an owner of the particular relay station (step S161). The prescribed pass-word is stored in the RAM 52 in advance. In cases where the deciphered particular pass-word agrees with the prescribed pass-word, a facsimile number existing in the character stream is detected, and a facsimile designated by the facsimile number is specified (step S162). Thereafter, the mail data of the electronic mail is processed in the format inverse converting unit 27 and the image data adjusting unit 31 in the same manner as in the first embodiment, and facsimile data obtained from the mail data is transmitted from the facsimile communicating unit 56 to the facsimile designated by the facsimile number through a telephone line (step S163).

In contrast, in cases where the deciphered particular pass-word does not agree with the prescribed pass-word (step S161), error information is transmitted from the LAN control unit 26 of the receiving side to the transmitting side to inform the transmitting side of the occurrence of an error (step S164). Also, in cases where the word "relay" is not found out (step S159), the mail data of the electronic mail is processed in the format inverse converting unit 27 and the image data adjusting unit 31 in the same manner as in the first embodiment, and image data obtained from the mail data is printed out by the printing unit 32 to reproduce the manuscript (step S165).

Accordingly, because the facsimile type electronic mail apparatus 51 functions as a relay station for the facsimile communication, a communication cost required for the facsimile communication can be saved as compared with that in a normal facsimile communication in cases where a fixed internet fee is paid by an owner every month.

Also, because an electronic mail communication between the transmitting and receiving sides is performed while using the enciphered pass-word added to the electronic mail, there is no probability that the facsimile type electronic mail apparatus 51 is used for a wrong purpose by an unspecified person to be against owner's interests. In addition, the electronic mail communication performed while using the enciphered pass-word can be applied for a conventional electronic mail system.

Also, because the occurrence of an error is informed the transmitting side in cases where a pass-word selected on the transmitting side does not agree with a prescribed pass-word of the receiving side, a user can know the selection error of the pass-word.

Next, a fifth embodiment in which a pass-word is enciphered in dependence on contents of a manuscript is described.

In cases where a pass-word is enciphered according to a fixed enciphering method and the enciphered pass-word is added to an electronic mail in the same manner as in the fourth embodiment, an unspecified person who unfairly gets the enciphered pass-word from an electronic mail can use the enciphered pass-word for a wrong purpose by adding the enciphered pass-word to another electronic mail. In the fifth embodiment, this problem is solved by using a cipher key.

Figures 16, 17:
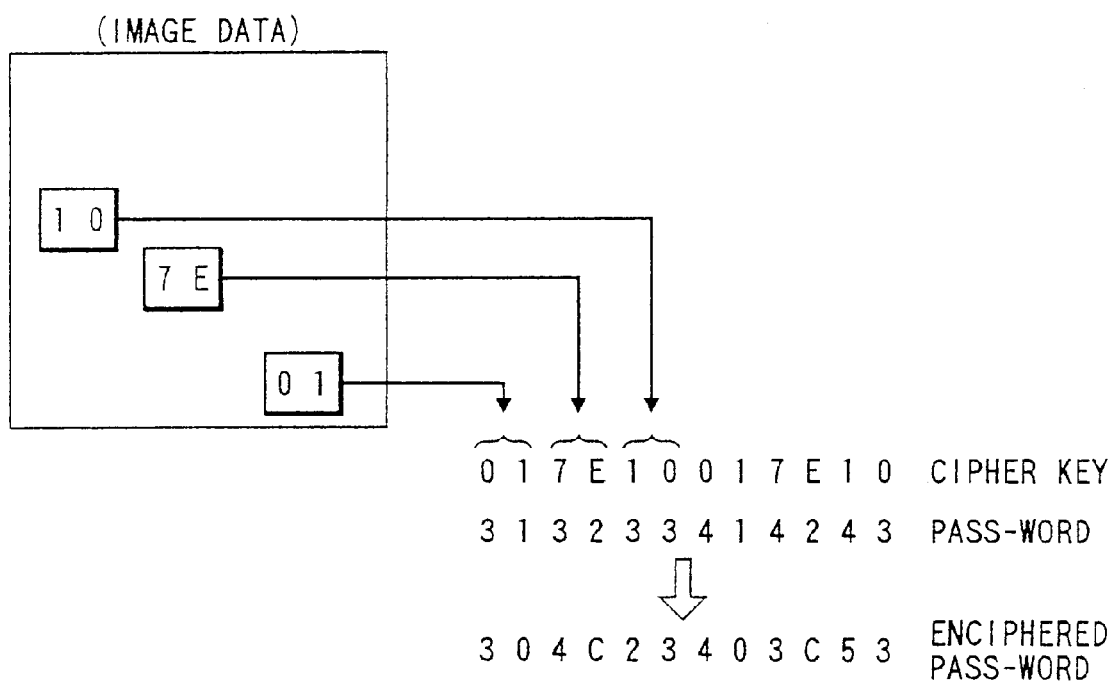
FIG. 16 shows a procedure for forming a cipher key in dependence on image data obtained from a manuscript and enciphering a pass-word by using the cipher key.
FIG. 17 shows a procedure for changing a pass-word to a ciphered pass-word according to a cipher key.

FIG. 16 shows a procedure for forming a cipher key in dependence on image data obtained from a manuscript and enciphering a pass-word by using the cipher key.

As shown in FIG. 16, pieces of data "01", "7E" and "10" placed at the fifth byte, the 50-th byte and the 100-th byte of image data are, for example, extracted as elements of a cipher key. When a pass-word "123ABC" is selected from the relay station list, the pass-word is expressed by an ASCII (American National Standard Code for Information Interchange) code stream "313233414243". Thereafter, the pieces of data "01", "7E" and "10" are arranged one after another in that order to form a cipher key on condition that the number of bits in the cipher key is the same as the number of bits in the ASCII code stream "313233414243" of the pass-word "123ABC". That is, a cipher key "017E10017E10" is determined. Thereafter, the ASCII code stream is divided to a plurality of elements "31", "32", "33", "41", "42" and "43" respectively corresponding one element of the cipher key, each element of the cipher key is expressed according to the binary notation, each element of the ASCII code stream is expressed according to the binary notation, a bit value of each element of the ASCII code stream corresponding to a bit value "1" of each element of the cipher key is changed (or inverted).

For example, as shown in FIG. 17, the first element "01" of the cipher key is expressed by binary numerals "0000 0001", and the first element "31" of the cipher key is expressed by binary numerals "0011 0001". Because a bit placed at the most right end of the binary numerals "0000 0001" is a value "1", a value "1" of a bit placed at the most right end of the binary numerals "0011 0001" is changed to an inverted value "0" to obtain new binary numerals "0011 0000" indicating "30", so that an element "30" of a ciphered pass-word is obtained. As a result, the pass-word "313233414243" expressed by the ASCII code stream is changed to a ciphered pass-word "304C23403C53" expressed by the ASCII code stream according to the cipher key determined from contents of the manuscript.

The above ciphering procedure is performed under the control of the CPU 30 of the apparatus 51.

Accordingly, because the cipher key changes with the contents of the manuscript, even though an unspecified person unfairly gets the enciphered pass-word from an electronic mail for a manuscript, because the enciphered pass-word cannot be used for another manuscript, the unspecified person cannot use the enciphered pass-word for a wrong purpose by adding the enciphered pass-word to another electronic mail.

In this embodiment, the cipher key changes with the contents of the manuscript. However, the fifth embodiment is not limited to the contents of the manuscript. For example, it is applicable that the cipher key changes with changeable information such as date information: added to the electronic mail.

Next, a sixth embodiment in which the occurrence of an error in a facsimile transmission is informed a transmitting side is described.

Figure 18:
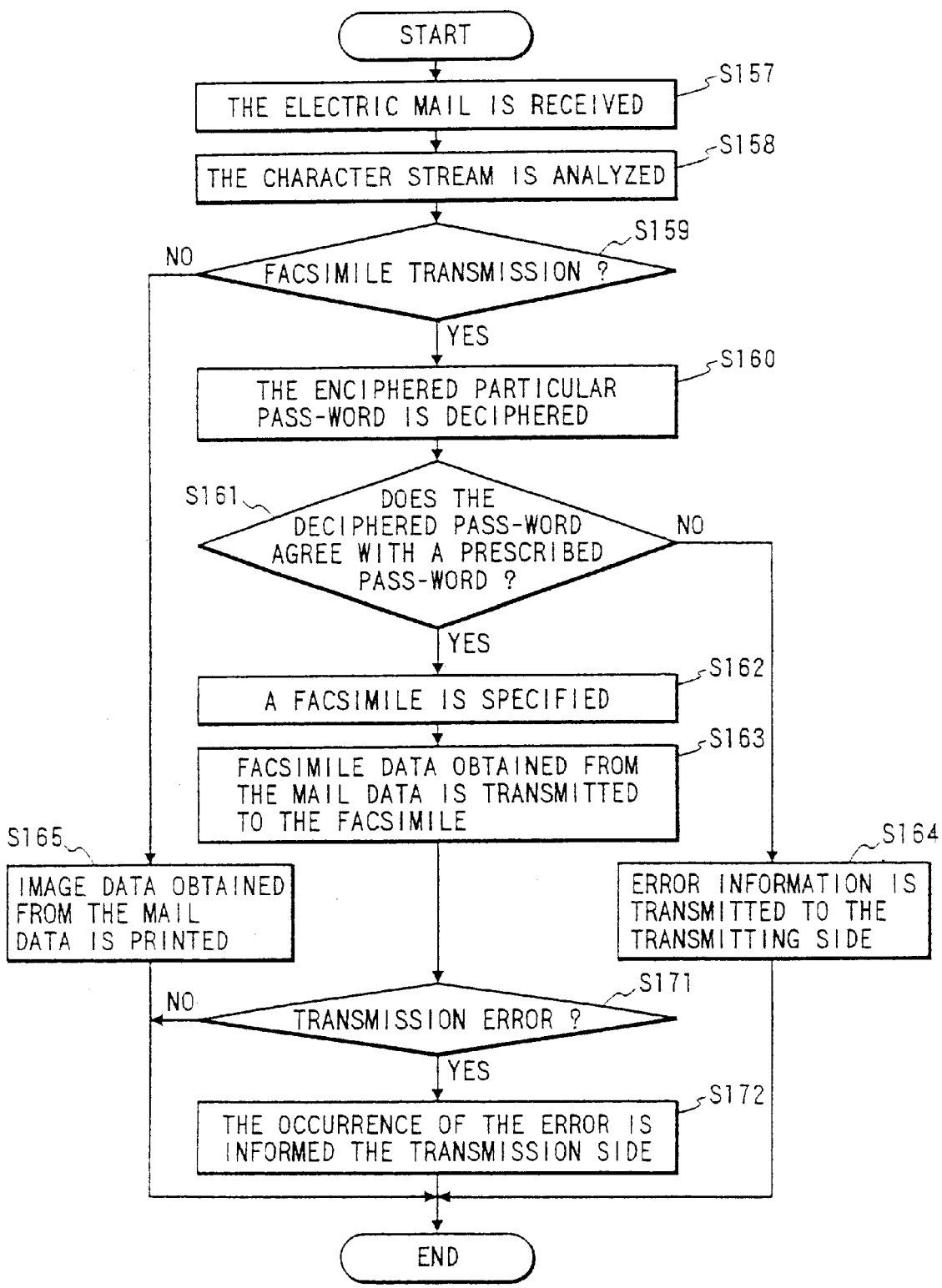
FIG. 18 is a flow chart of an operation in which the occurrence of an error in a facsimile transmission is informed a transmitting side according to an image communicating method of the sixth embodiment.

FIG. 18 is a flow chart of an operation in which the occurrence of an error in a facsimile transmission is informed a transmitting side according to an image communicating method of the sixth embodiment.

As shown in FIG. 18, the steps S157 to S165 are performed in the same manner as in the fourth embodiment. In this case, an address of the transmitting side is written in a header of the electronic mail. Thereafter, when the facsimile data is transmitted from the facsimile communicating unit 56 to the facsimile designated by the facsimile number (step S163), it is judged by the CPU 30 whether or not an error occurs in a facsimile transmission (step S171).In cases where an error occurs in a facsimile transmission, an address of the transmitting side written in a header of the electronic mail is identified, and the occurrence of the error in the facsimile transmission is informed the transmitting side by an electronic mail (step S172).

Accordingly, because the occurrence of the error in the facsimile transmission is informed the transmitting side, a user of the transmitting side can immediately know that the image of the manuscript is not transmitted to the facsimile.

Next, a seventh embodiment in which print data transmitted from a personal computer of a transmitter is analyzed in a facsimile type electronic mail apparatus of a receiver and a facsimile transmission to a facsimile identified by a facsimile number included in the print data is performed is described.

Figure 19:
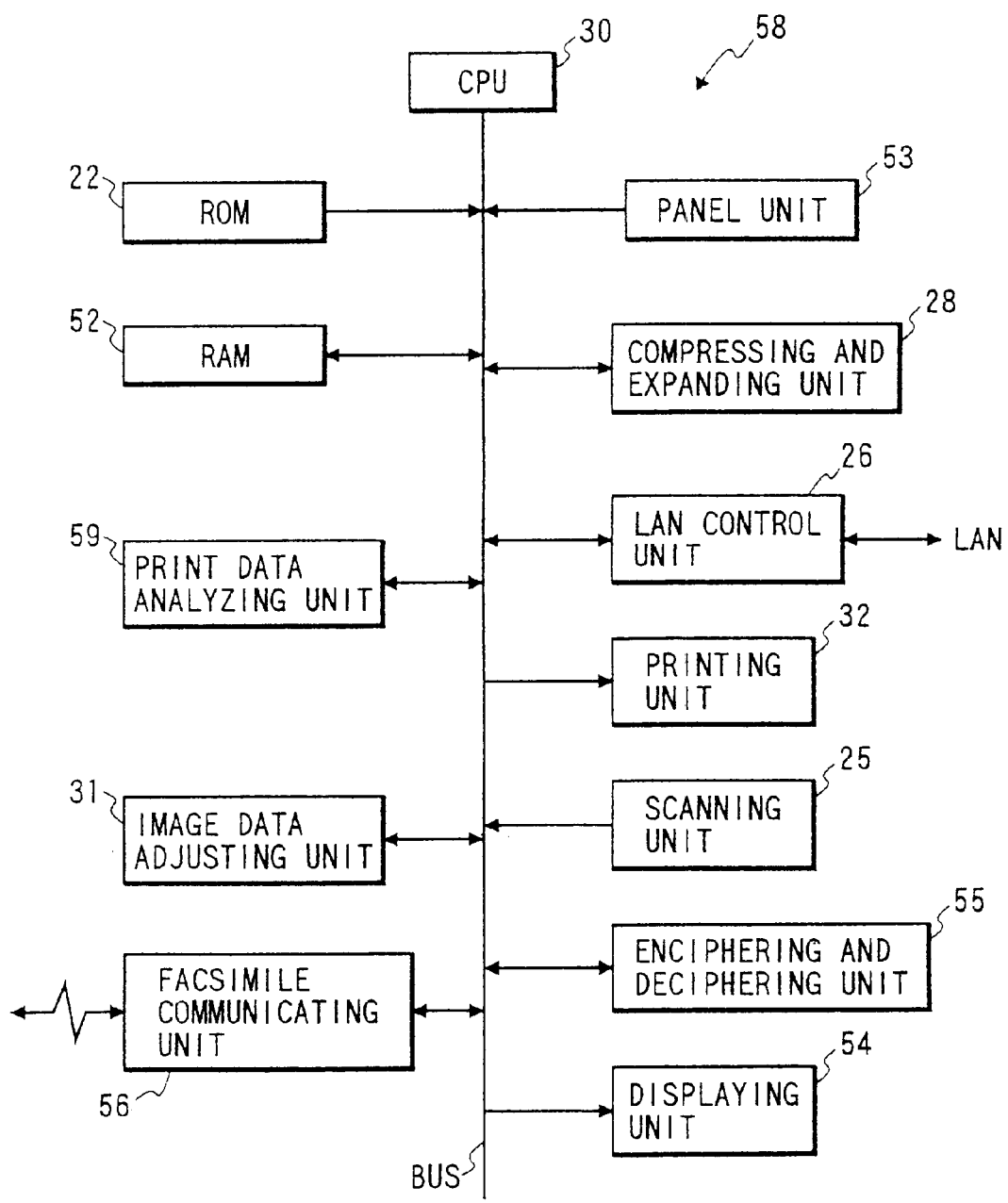
FIG. 19 is a block diagram of a facsimile type electronic mail apparatus functioning as a relay station according to a seventh embodiment.

FIG. 19 is a block diagram of a facsimile type electronic mail apparatus functioning as a relay station according to a seventh embodiment.

As shown in FIG. 19, a facsimile type electronic mail apparatus 58 comprises the ROM 22, the RAM 52, the panel unit 53, the scanning unit 25, the LAN control unit 26, a print data analyzing unit 59 for analyzing print data received in the LAN control unit 26 and extracting both a facsimile number designating a facsimile and an electronic mail address designating an error information receiving apparatus, the compressing and expanding unit 28, the CPU 30, the image data adjusting unit 31, the printing unit 32, the displaying unit 54, the enciphering and deciphering unit 55, and the facsimile communicating unit 56.

In the above configuration of the facsimile type electronic mail apparatus 58, a facsimile transmitting operation performed by receiving a printing instruction is described with reference to FIG. 20.

Figure 20:
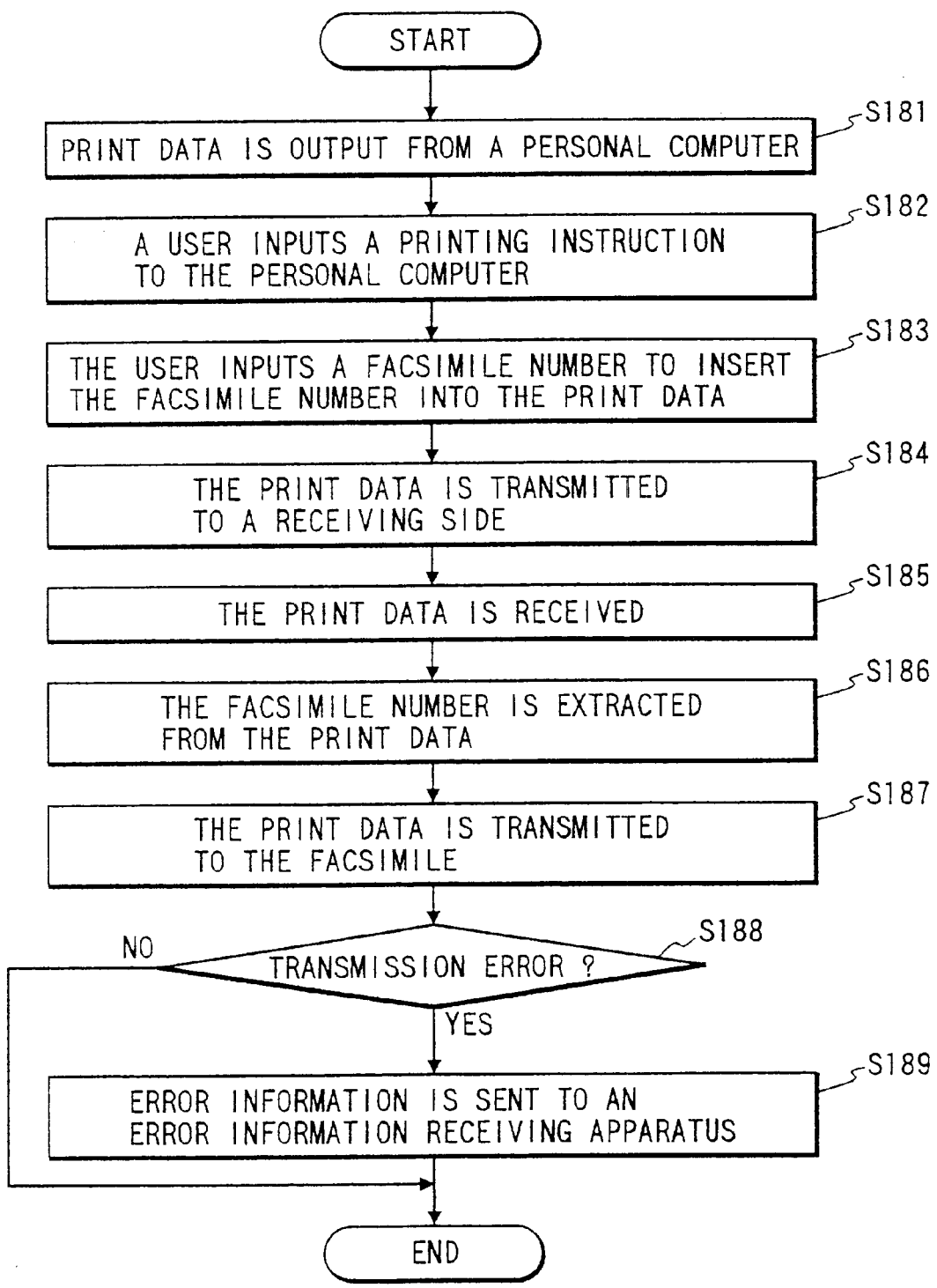
FIG. 20 is a flow chart of an operation in which print data transmitted from a personal computer of a transmitting side is analyzed and transmitted to a facsimile identified by a facsimile number included in the print data.

FIG. 20 is a flow chart of an operation in which print data transmitted from a personal computer of a transmitting side is analyzed and transmitted to a facsimile identified by a facsimile number included in the print data.

As shown in FIG. 20, a printing program is installed in a personal computer (or a terminal) to output print data from the personal computer (step S181).In the printing program, an instruction for inserting a facsimile number denoting a destination, to which the print data is output in a facsimile transmission, into the print data and another instruction for inserting an electronic mail address designating an error information receiving apparatus into the print data are included. The electronic mail address is stored in a memory of the personal computer in advance by executing the printing program. Therefore, when the printing program is executed later, the electronic mail address is automatically inserted into the print data.

Thereafter, when a user of the personal computer inputs a printing instruction to the personal computer (step S182), the printing program is executed, and the user is urged to input a facsimile number. When the facsimile number is input by the user (step S183), the facsimile number is inserted into the print data, and the print data is transmitted to the facsimile type electronic mail apparatus 58 of a receiving side through the LAN 14 (step S184). Thereafter, when the print data is received in the LAN control unit 26 of the apparatus 58 according to an LAN print protocol (step S185), the print data is expanded in the compressing and expanding unit 28 and is analyzed in the print data analyzing unit 59, and the facsimile number denoting the destination is extracted from the print data (step S186). Thereafter, the print data is processed in the image data adjusting unit 31 if necessary and is transmitted from the facsimile communicating unit 56 to a facsimile designated by the facsimile number through a telephone line (step S187). Thereafter, it is judged by the CPU 30 whether or not an error occurs in a facsimile transmission (step S188). In cases where an error occurs in the facsimile transmission, the electronic mail address is extracted from the print data in the print data analyzing unit 59, and the occurrence of the error in the facsimile transmission is informed an error information receiving apparatus designated by the electronic mail address (step S189) by sending error information with an electronic mail.

Accordingly, the print data can be transmitted to the facsimile when the user inputs a printing instruction to the personal computer. Also, in cases where an error occurs in the facsimile transmission, the user can be immediately informed of the occurrence of the error by an electronic mail.

Figure 21:
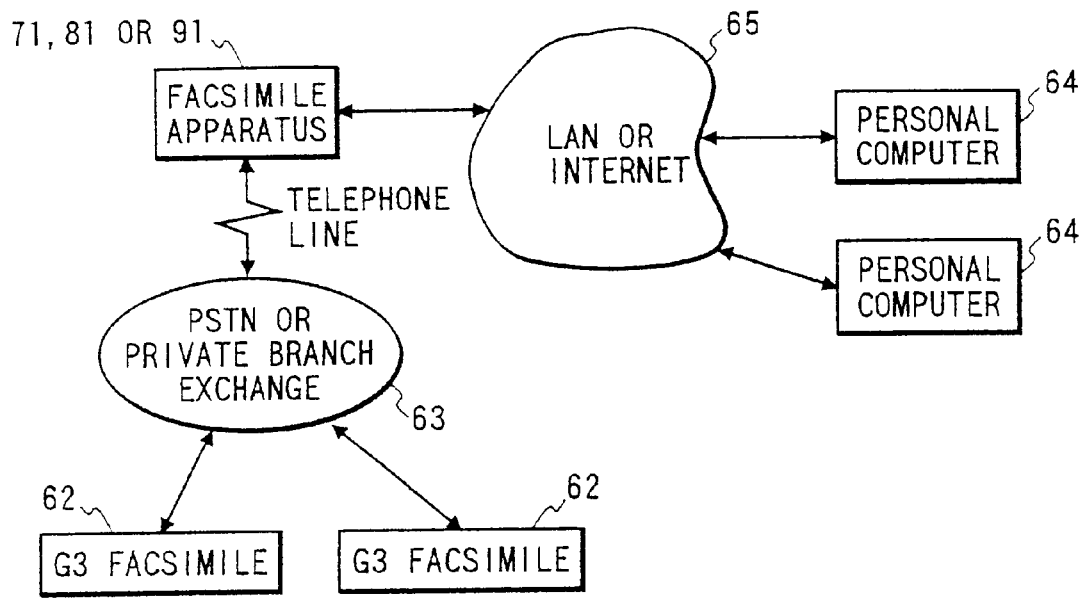
FIG. 21 is a conceptual view of operational circumstances in which a facsimile type electronic mail apparatus is operated.

FIG. 21 is a conceptual view of operational circumstances in which a facsimile type electronic mail apparatus is operated.

As shown in FIG. 21, a facsimile apparatus 71, 81 or 91 according to eighth to fifteenth embodiments is operated in operational circumstances in which facsimile data is transmitted from one of a plurality of G3 facsimiles 62 to the facsimile apparatus through a telephone line of a public switches telephone network (PSTN) or a private branch exchange 63 and mail data obtained by converting a facsimile format of the facsimile data to a mail format is transmitted from the facsimile apparatus to one of terminals (or personal computers) 64 through an LAN or an internet 65 by an electronic mail. In this case, an ethernet is, for example, used as a protocol for the electronic mail transmitted through the LAN. An information designating one terminal to which the mail data is transmitted is placed at a sub-address of the facsimile data, and the sub-address is prescribed in a T-30 rule of protocol standards for a facsimile transmission. Also, in cases where an error occurs in the transmission of the electronic mail because of an unknown destination of the electronic mail or the like, a facsimile number specifying the G3 facsimile 62 from which the facsimile data is transmitted to the apparatus 71, 81 or 91 is examined, and error information is transmitted from the facsimile apparatus to the G3 facsimile 62. In this case, the facsimile number is known from a transmitting subscriber identification (TSI) included in the facsimile data. The TSI is also prescribed in the T-30 rule of the protocol standards. As is described above, it is applicable that the sub-address and/or the TSI be used for correspondent information included in the facsimile data.

Figure 22:
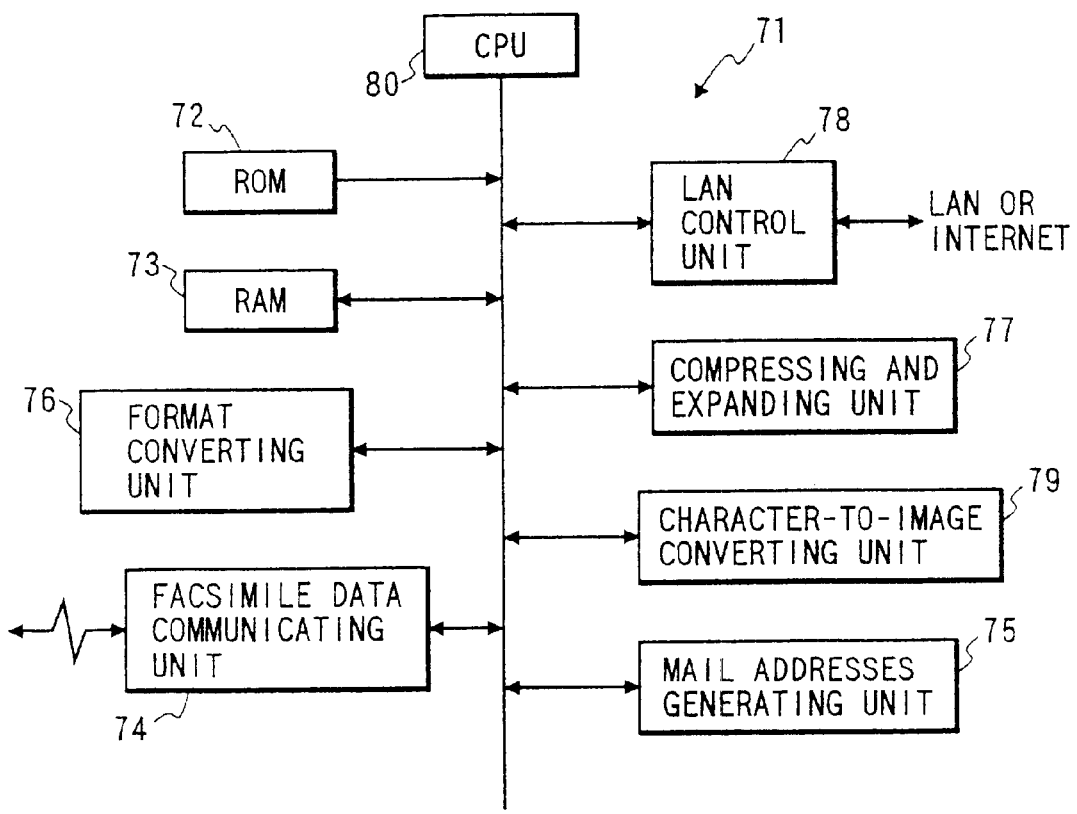
FIG. 22 is a block diagram of a facsimile apparatus according to an eighth embodiment of the present invention.

FIG. 22 is a block diagram of a facsimile apparatus according to an eighth embodiment of the present invention.

As shown in FIG. 22, a facsimile apparatus 71 comprises
a ROM 72 for storing a program,
a RAM 73 for storing data used for the execution of the program stored in the ROM 22 and storing a corresponding table of a plurality of sets respectively composed of a transmitter's electronic mail address, an informing facsimile number and a receiver's electronic mail address,
a facsimile data communicating unit 74 for receiving facsimile data transmitted from one facsimile 62 of a transmitter and transmitting either error information indicating the occurrence of an error in the transmission of the facsimile data or a reply mail to the facsimile 62;
a mail addresses generating unit 75 for generating a transmitter's electronic mail address of the facsimile 62 for each facsimile data to uniquely specifying one of the facsimiles 62;
a format converting unit 76 for converting an image format of the facsimile data to a mail format to change the facsimile data received by the facsimile data communicating unit 74 to mail data and inserting the transmitter's electronic mail address generated in the mail addresses generating unit 75 into the mail data;
a compressing and expanding unit 77 for compressing the mail data obtained in the format converting unit 76;
an LAN control unit 78 for transmitting the mail data compressed by the compressing and expanding unit 77 to one personal computer 64 of a receiver by an electronic mail and receiving the error information or the reply mail transmitted from the personal computer 64;
a character-to-image converting unit 79 for converting a character included in the error information or the reply mail received by the LAN control unit 78 to received image data to transmit the received image data to the facsimile 62 through the facsimile data communicating unit 74; and
a CPU 80 for controlling the constitutional elements 72 to 79.

In the above configuration of the facsimile apparatus 71, an operation performed by the facsimile apparatus 71 when facsimile data is received is described with reference to FIG. 23.

Figures 23, 24:
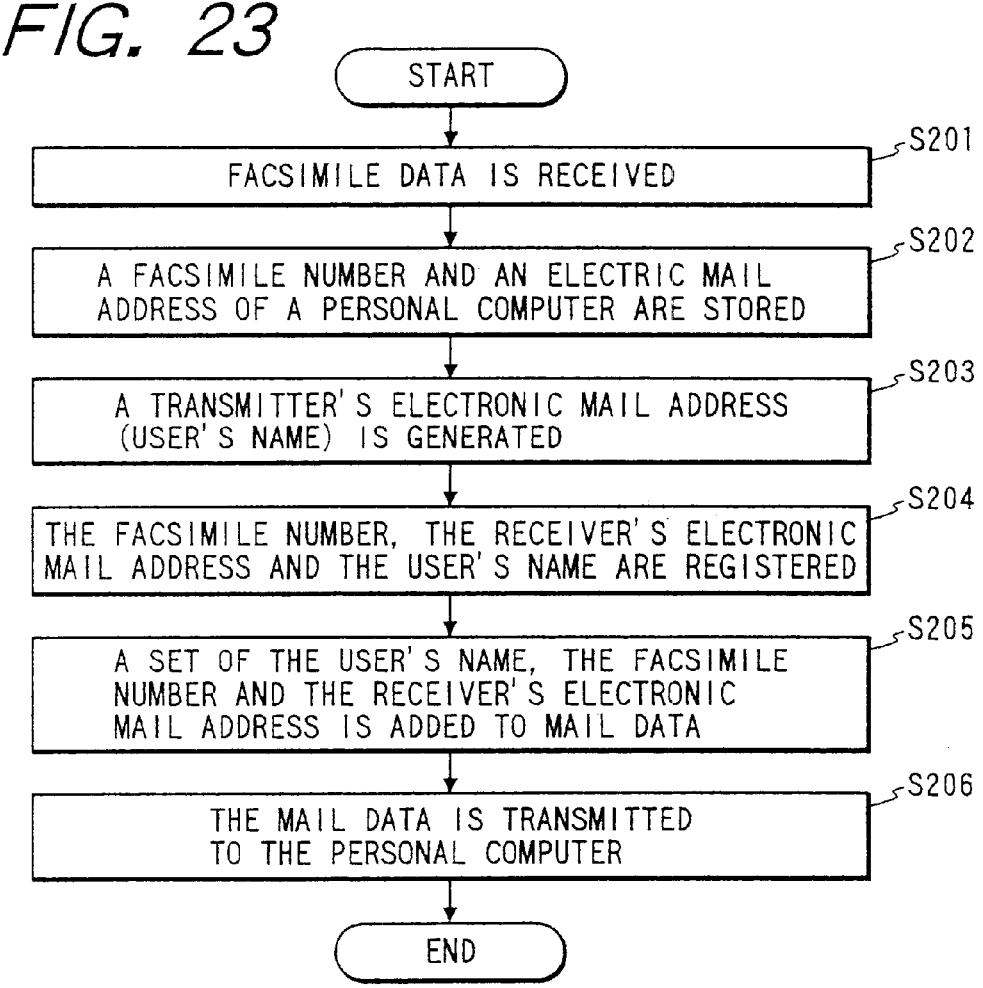
FIG. 23 is a flow chart showing an operation performed by the facsimile apparatus shown in FIG. 22 according to the eighth embodiment when facsimile data is received in the facsimile apparatus.
FIG. 24 shows a corresponding table of a plurality of sets of transmitter's electronic mail addresses (or user's names), informing facsimile numbers and receiver's electronic mail addresses.

FIG. 23 is a flow chart showing an operation performed by the facsimile apparatus 71 according to the eighth embodiment when facsimile data is received in the facsimile apparatus 71.

A user (or a transmitter) of one facsimile 62 writes in advance a facsimile number specifying the facsimile 62 in facsimile data as a transmitting subscriber identification. Also, the user inputs an electronic mail address of one personal computer 64 (or a receiver) in advance in a sub-address placed in the facsimile data. Thereafter, when the facsimile data transmitted from the facsimile 62 is received in the facsimile apparatus 71 (step S201), the facsimile number is extracted from the facsimile data and is stored in the RAM 73 as an informing facsimile number, and the electronic mail address of the personal computer 64 is stored in the RAM 73 as a receiver's electronic mail address (step 5202). Because the receiver's electronic mail address is written by using English letters, each English letter is obtained by converting a numeral according to the ASCII code or the like and is stored in a memory (not shown).

Though it is prescribed that a group of numerals can be only used as data stored in the sub-address, because it is expected that the use of a group of English characters in the sub-address is allowed in the future, the receiver's electronic mail address composed of English characters is used in this embodiment. In cases where a company using the facsimile apparatus 71 is the same as that using the facsimile 62, it is applicable that a corresponding table of a group of numerals written in the sub-address and an electronic mail address be registered.

Thereafter, a user's name uniquely specifying the facsimile 62 is generated in the mail addresses generating unit 75 as a transmitter's electronic mail address (step S203). For example, numbers from 1 to 9999 are allocated as the user's name without overlapping the numerals. The user's name is registered in a corresponding table shown in FIG. 24. That is, each of numbers 0001, 0002,—, 9999 registered in a column of a transmitter's electronic mail address is one user's name, and an electronic mail address of the facsimile apparatus 71 is expressed by "0002@intfax.mgcs.co.jp". "intfax" is a host name of the facsimile apparatus 71, and "mgcs.co.jp" indicates a domain of a company in which the facsimile apparatus 71 is settled.

Thereafter, the informing facsimile number and the receiver's electronic mail address are registered in the corresponding table in correspondence to the user's name (step S204). The corresponding table is stored in the RAM 73. Thereafter, an image format of the facsimile data received by the facsimile data communicating unit 74 is converted to a mail format by the format converting unit 76 to produce mail data, and a set of the user's name, the informing facsimile number and the receiver's electronic mail address is added to the mail data (step S205). The mail format is obtained by converting the facsimile data to data of a TIFF type (a format for managing an image in a personal computer) and adding a header formed according to MIME (standards for receiving and transmitting data except a text by an electronic mail). Thereafter, the mail data is compressed by the compressing and expanding unit 77 and is transmitted by a transmitter's electronic mail from the LAN control unit 78 to the personal computer 64 specified by the receiver's electronic mail address through the RAN 65 (step S206).

When the personal computer 64 receives the electronic mail transmitted from the facsimile apparatus 71, the host name "intfax" of the electronic mail address "0002@intfax.mgcs. co.jp" is recognized by the personal computer 64, and error information or reply information of a receiver's electronic mail is returned to the facsimile apparatus 71 by transmitting the receiver's electronic mail to a destination designated by the host name. In cases where a transmission error occurs in the transmission of the transmitter's electronic mail, error information is transmitted from a gate way placed in the LAN 65 to the facsimile apparatus 71.

Figure 25:
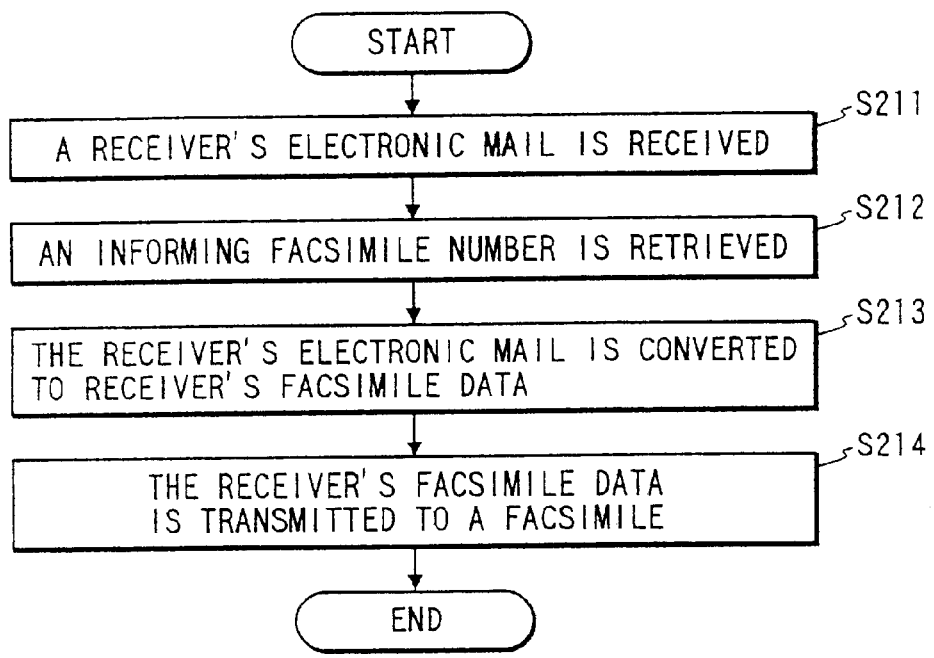
FIG. 25 is a flow chart showing an operation performed by the facsimile apparatus shown in FIG. 22 according to the eighth embodiment when an electronic mail transmitted from a personal computer of a receiver is returned to a transmitter.

FIG. 25 is a flow chart showing an operation performed by the facsimile apparatus 71 according to the eighth embodiment when an electronic mail transmitted from the personal computer 64 of the receiver is returned to the transmitter.

When the receiver's electronic mail is received in the LAN control unit 78 (step S211), the user's name "0002" of the electronic mail address "0002@intfax.mgcs.co.jp" is recognized, and the informing facsimile number 03-5434-7088 is retrieved from the corresponding table stored in the RAM 73 according to the user's name "0002" (step S212). In this case, any unknown person cannot send an electronic mail to the facsimile apparatus 71 because the unknown person does not know the user's name "0002".

Thereafter, the receiver's electronic mail is converted to receiver's facsimile data (step S213). In cases where the receiver's electronic mail is composed of characters or English letters, the receiver's electronic mail is converted to receiver's image data in the character-to-image converting unit 79, and the receiver's image data is converted to receiver's facsimile data in the compressing and expanding unit 77. Thereafter, the receiver's facsimile data is transmitted from the FAX data communicating unit 74 to the facsimile 62 specified by the informing facsimile number through a telephone line (step S214).

Accordingly, because the user's name uniquely specifying the facsimile 62 is generated in the mail addresses generating unit 75 as a transmitter's electronic mail address, even though an error occurs in the transmission of the transmitter's electronic mail and error information is returned to the facsimile apparatus 71, the facsimile 62 can be specified according to the user's name, and the error information can be correctly transmitted to the facsimile 62.

In this embodiment, the facsimile number specifying the facsimile 62 is registered in the corresponding table. However, it is applicable that a telephone number, an electronic mail address or information specifying a destination be useful in place of the facsimile number.

Next, a ninth embodiment according to the present invention is described with reference to FIG. 26.

In the eighth embodiment, the error information of the receiver's electronic mail is written in English, and the error information is printed as it is by the facsimile 62. In this case, because the error information is printed on a facsimile paper in English, a Japanese person who is not familiar with an electronic mail cannot immediately realize contents of the receiver's electronic mail. Therefore, in the ninth embodiment, the error information informed in English is translated into Japanese.

Figure 26:
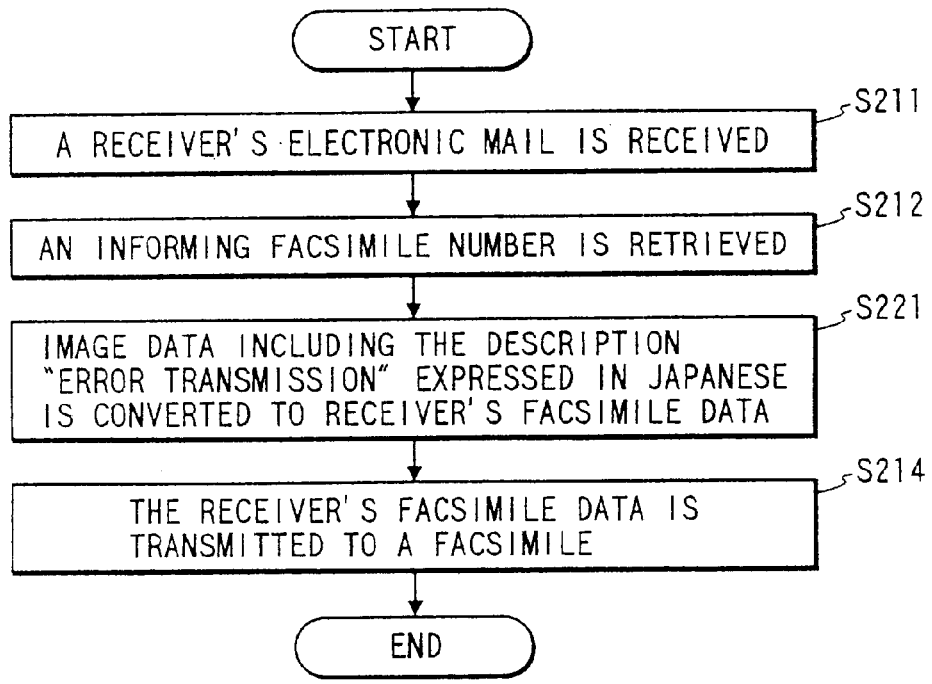
FIG. 26 is a flow chart showing an operation performed by the facsimile apparatus shown in FIG. 22 according to the eighth embodiment when an electronic mail transmitted from a personal computer of the receiver is returned to the facsimile apparatus.

FIG. 26 is a flow chart showing an operation performed by the facsimile apparatus 71 according to the eighth embodiment when an electronic mail transmitted from the personal computer 64 is returned to the facsimile apparatus 71.

As shown in FIG. 26, the steps S211 and S212 are performed in the same manner as in the eighth embodiment. Thereafter, in cases where an error information is included in the receiver's electronic mail or the receiver's electronic mail is transmitted from an electronic mail address not registered in the corresponding table, a description "error transmission" expressed in Japanese is read out from the RAM 73, and the receiver's electronic mail, the description "error transmission" expressed in Japanese and a mail address of the receiver is changed to receiver's image data in the character-to-image converting unit 79, and the image data is converted to receiver's facsimile data (step S221). Thereafter, the receiver's facsimile data is transmitted from the FAX data communicating unit 74 to the facsimile 62 specified by the informing facsimile number through a telephone line (step S214).

Accordingly, even though a Japanese person who is not familiar with an electronic mail receives the error information when he sends an electronic mail to a receiver, he can immediately realize the occurrent of the transmission error when he receive the receiver's facsimile data.

Next, a tenth embodiment according to the present invention is described with reference to FIG. 27.

In the tenth embodiment, when a transmitter transmits a facsimile converted to an transmitter's electronic mail to a receiver (or the personal computer 64), a message "Please return a blank electronic mail to a transmitter's electronic mail address written in the transmitter's electronic mail" is inserted into the transmitter's electronic mail. Therefore, a receiver's electronic mail in which a mail address of the receiver and a user's name are written in a header of the receiver's electronic mail and any other contents are not written.

Figure 27:
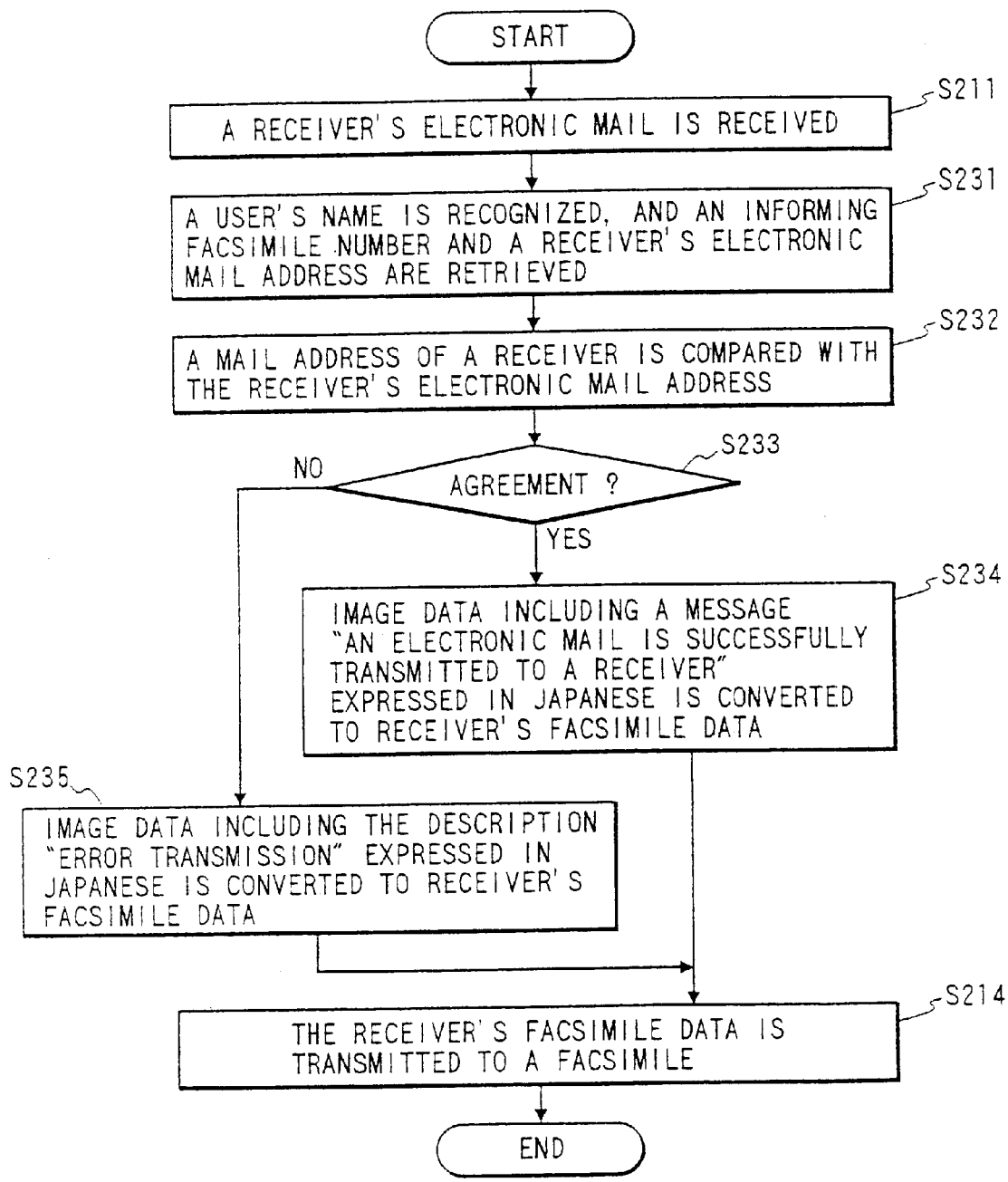
FIG. 27 is a flow chart showing an operation performed by the facsimile apparatus shown in FIG. 22 according to a tenth embodiment when a receiver's electronic mail transmitted from a personal computer of a receiver is returned to the facsimile apparatus.

FIG. 27 is a flow chart showing an operation performed by the facsimile apparatus 71 according to the tenth embodiment when a receiver's electronic mail transmitted from the personal computer 64 is returned to the facsimile apparatus 71.

When the receiver's electronic mail is received in the LAN control unit 78 (step S211), the user's name of the receiver's electronic mail address is recognized, and an informing facsimile number and a receiver's electronic mail address are retrieved from the corresponding table stored in the RAM 73 according to the user's name (step S231). Thereafter, the mail address of the receiver written in the header of the receiver's electronic mail by the receiver is compared with the receiver's electronic mail address retrieved from the corresponding table (step S232). Thereafter, it is judged in the CPU 80 whether or not the mail address of the receiver agrees with the receiver's electronic mail address (step S233).

In cases where the mail address of the receiver agrees with the receiver's electronic mail address, because the transmitter's electronic mail is correctly received by the receiver, a particular message "an electronic mail is successfully transmitted to a receiver" expressed in Japanese is read out from the RAM 73, and the particular message and the mail address of the receiver is changed to receiver's image data in the character-to-image converting unit 79, and the image data is converted to receiver's facsimile data (step S234). In contrast, in cases where the mail address of the receiver does not agree with the receiver's electronic mail address (step S233), because the transmitter's electronic mail is received by a wrong receiver, a description "error transmission" expressed in Japanese is read out from the RAM 73, and the description "error transmission" expressed in Japanese and the mail address of the receiver is changed to receiver's image data in the character-to-image converting unit 79, and the image data is converted to receiver's facsimile data (step S235). Thereafter, the receiver's facsimile data is transmitted from the FAX data communicating. unit 74 to the facsimile 62 specified by the informing facsimile number through a telephone line (step S214).

Accordingly, when a correct receiver successfully receives an electronic mail transmitted from a transmitter, the transmitter can ascertain that the receiver actually reads contents of the transmitter's electronic mail.

Next, an eleventh embodiment according to the present invention is described with reference to FIG. 28.

In cases where a transmission error of an electronic mail occurs in a transmitter's electronic mail, error information is immediately returned to a transmitter in general. Therefore, in cases where error information is not returned to a transmitter even though a prescribed time elapses after the transmission of an electronic mail, it is assumed that the electronic mail is successfully received by a receiver. In this case, a set of a user's name, an informing facsimile number and a receiver's electronic mail address registered in the corresponding table as a record of the transmitter's electronic mail is not required. Therefore, the record is deleted from the corresponding table after a prescribed time elapses.

Figure 28:
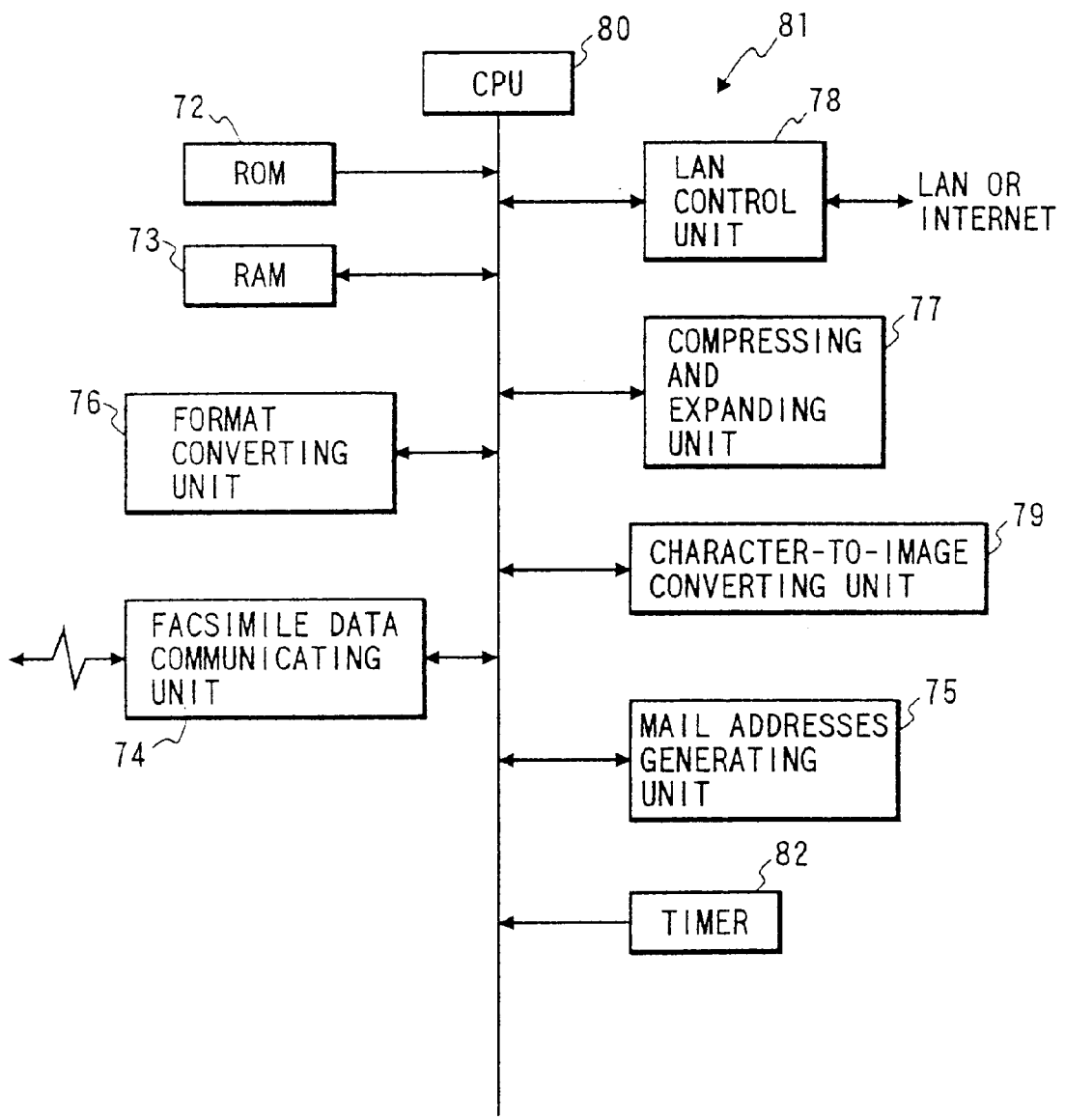
FIG. 28 is a block diagram of a facsimile apparatus according to an eleventh embodiment of the present invention.

FIG. 28 is a block diagram of a facsimile apparatus according to an eleventh embodiment of the present invention.

As shown in FIG. 28, a facsimile apparatus 81 comprises the ROM 72, the RAM 73, the facsimile data communicating unit 74, the mail addresses generating unit 75, the format converting unit 76, the compressing and expanding unit 77, the LAN control unit 78, the character-to-image converting unit 79, the CPU 80 and a timer 82 for measuring an elapsed time to delete a record registered in the corresponding table of the RAM 73 when a prescribed time like 24 hours elapses after the record is stored in the RAM 73 under the control of the CPU 80.

In the above configuration of the facsimile apparatus 81, after an informing facsimile number and a receiver's electronic mail address are registered in the corresponding table as a particular record in correspondence to a user's name in the step S204 of FIG. 23, an elapsed time is measured by the timer 82. When a prescribed time like 24 hours elapses after the particular record is registered in the corresponding table, the particular record is deleted from the corresponding table.

Accordingly, because a set of a user's name, an informing facsimile number and a receiver's electronic mail address denoting a record of a transmitter's electronic mail is deleted when a prescribed time elapsed after the record is registered in the corresponding table, a volume of records registered in the corresponding table is not enormously increased. Therefore, the number of facsimiles 62 (or transmitters) is not limited even though a memory capacity allocated to the corresponding table is limited.

Next, an operation performed in the facsimile apparatus 71 is described according to a twelfth embodiment of the present invention.

When a receiver's electronic mail is returned to the LAN control unit 78 as a reply of a transmitter's electronic mail in the step S211 of FIG. 25, an informing facsimile number is retrieved from the corresponding table stored in the RAM 73 in the step S212, the receiver's electronic mail is converted to receiver's facsimile data in the step S213, and the receiver's facsimile data is transmitted to one facsimile 62 specified by the informing facsimile number in the step S214. Thereafter, a set of a user's name, an informing facsimile number and a receiver's electronic mail address denoting a record of the transmitter's electronic mail is deleted.

Accordingly, because a set of a user's name, an informing facsimile number and a receiver's electronic mail address denoting a record of a transmitter's electronic mail is deleted each time a reply of the transmitter's electronic mail is returned to a facsimile 62, a volume of records registered in the corresponding table is not enormously increased. Therefore, the number of facsimiles 62 (or transmitters) is not limited even though a memory capacity allocated to the corresponding table is limited.

Also, in cases where a concept of the eleventh embodiment and a concept of the twelfth embodiment are combined, the corresponding table can be moreover effectively managed.

Next, an operation performed in the facsimile apparatus 71 is described with reference to FIG. 29 according to a thirteenth embodiment of the present invention.

In this embodiment, a receiver who receives a transmitter's electronic mail manages a record of the corresponding table. That is, in cases where the receiver intends to delete a particular record corresponding to the transmitter's electronic mail, a word "deletion" is inserted into a receiver's electronic mail transmitted to a transmitter as a reply, and the particular record registered in the corresponding table is deleted according to the word "deletion" under the control of the CPU 80.

Figure 29:
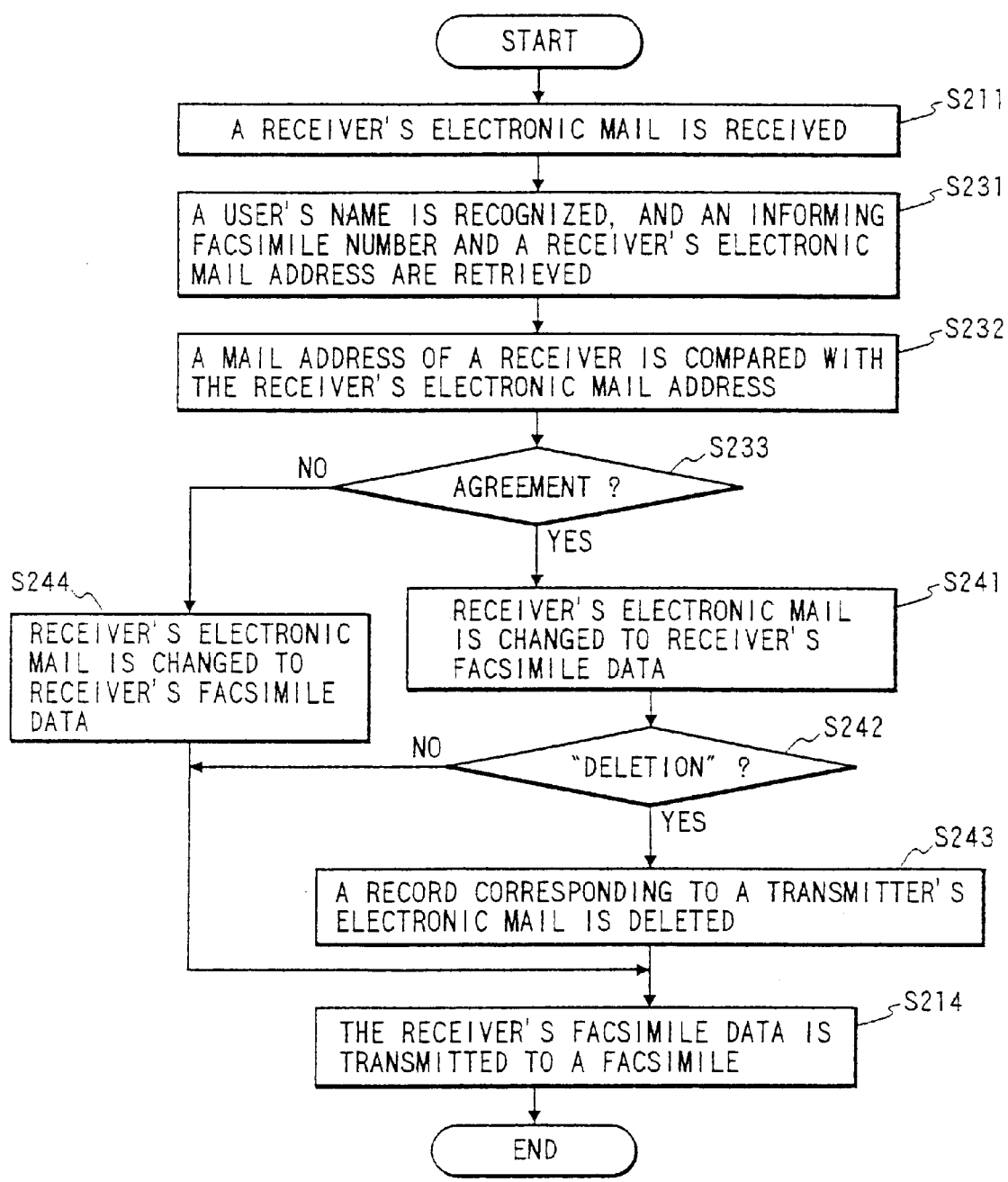
FIG. 29 is a flow chart showing an operation performed by the facsimile apparatus shown in FIG. 22 according to a thirteenth embodiment when a receiver's electronic mail transmitted from a personal computer of a receiver is returned to the facsimile apparatus.

FIG. 29 is a flow chart showing an operation performed by the facsimile apparatus 71 according to the thirteenth embodiment when a receiver's electronic mail transmitted from the personal computer 64 is returned to the facsimile apparatus 71.

The steps S211, S231, S232 and S233 are performed in the same manner as in the tenth embodiment. In this case, in cases where the receiver intends to delete a particular record corresponding to the transmitter's electronic mail, a word "deletion" is inserted into a receiver's electronic mail. In cases where the mail address of the receiver agrees with the receiver's electronic mail address (step S233), a receiver's electronic mail is changed to receiver's image data in the character-to-image converting unit 79, and the receiver's image data is converted to receiver's facsimile data (step S241). Thereafter, it is judged in the CPU 80 whether or not the word "deletion" is inserted into the receiver's facsimile data (step S242). In cases where the word "deletion" is inserted into the receiver's facsimile data, a record corresponding to the transmitter's electronic mail is deleted from the corresponding table (step S243), and the receiver's facsimile data is transmitted to one facsimile 62 specified by the informing facsimile number in the step S214. In contrast, in cases where the word "deletion" is not inserted into the receiver's facsimile data, the receiver's facsimile data is transmitted to one facsimile 62 in the step S214 without deleting the record.

In contrast, in cases where the mail address of the receiver does not agree with the receiver's electronic mail address (step S233), the receiver's electronic mail is changed to receiver's image data in the character-to-image converting unit 79, and the receiver's image data is converted to receiver's facsimile data (step S244). Thereafter, the receiver's facsimile data is transmitted to one facsimile 62 in the step S214.

Accordingly, because a record corresponding to the transmitter's electronic mail is deleted from the corresponding table in cases where the receiver intends to delete the record, the receiver can manage the corresponding table stored in the RAM 73. That is, the receiver can return a receiver's electronic mail any time to the facsimile 62 through the facsimile apparatus 71, or the receiver can transmit a receiver's electronic mail many times to the facsimile 62 through the facsimile apparatus 71 until the word "deletion" is inserted into the receiver's facsimile data by the receiver.

Next, a fourteenth embodiment according to the present invention is described with reference to FIGS. 30 and 31.

In this embodiment, a replay or transmission error information for facsimile data transmitted to a receiver is received by a telephone of a transmitter.

Figure 30:
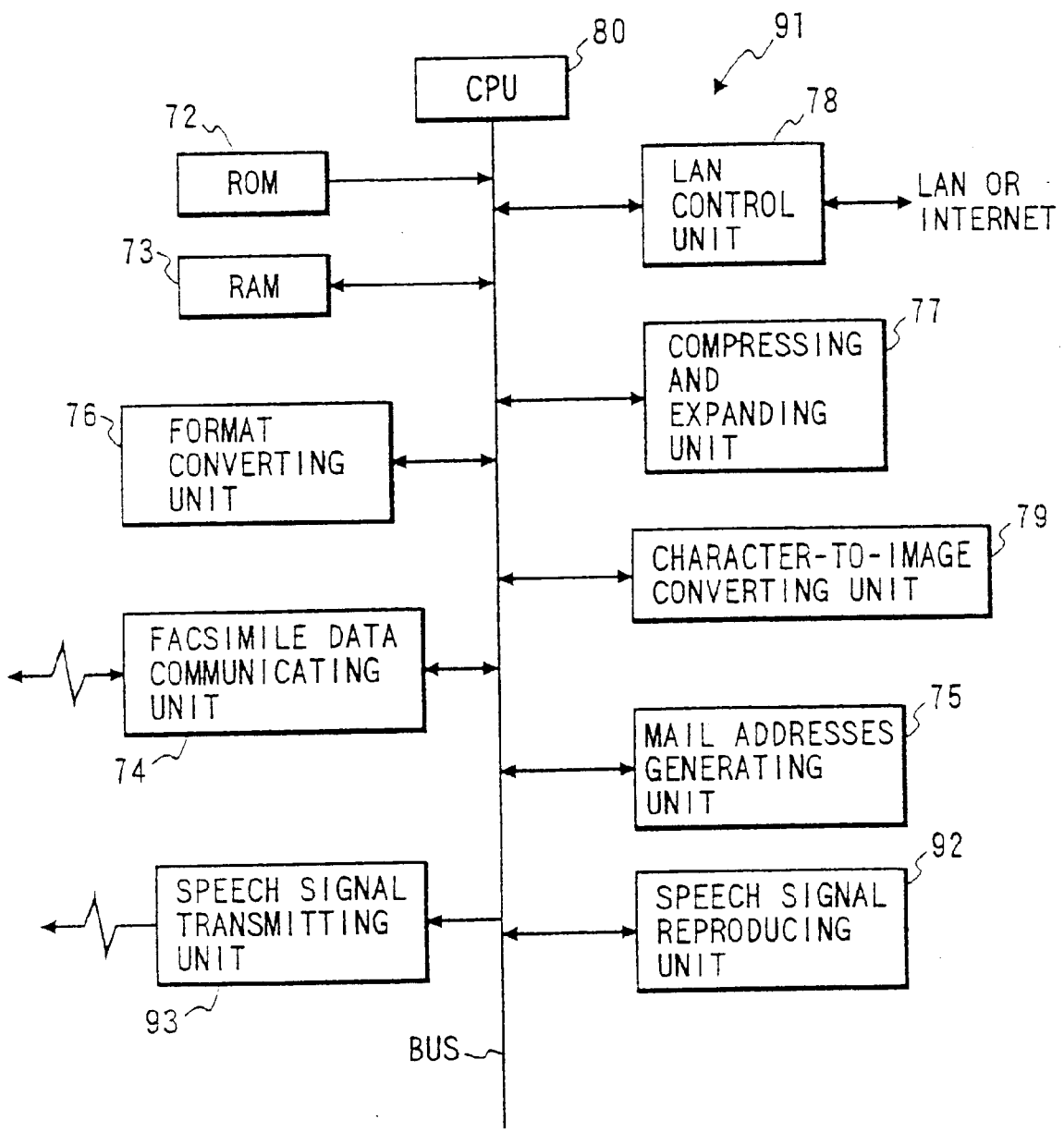
FIG. 30 is a block diagram of a facsimile apparatus according to a fourteenth embodiment of the present invention.

FIG. 30 is a block diagram of a facsimile apparatus according to a fourteenth embodiment of the present invention.

As shown in FIG. 30, a facsimile apparatus 91 comprises the ROM 72, the RAM 73 for storing data used for the execution of the program stored in the ROM 22, storing a corresponding table of a plurality of sets respectively composed of a transmitter's electronic mail address, an informing telephone number and a receiver's electronic mail address, storing a speech file of a speech signal indicating a message "successful transmission" and another speech file of a speech signal indicating a message "transmission error", the facsimile data communicating unit 74, the mail addresses generating unit 75, the format converting unit 76, the compressing and expanding unit 77, the LAN control unit 78, the character-to-image converting unit 79, the CPU 80, a speech signal reproducing unit 92 for reproducing the speech signal indicating the message "successful transmission" or the speech signal indicating the message "transmission error" from the speech file stored in the RAM 73, and a speech signal transmitting unit 93 for transmitting the speech signal reproduced by the speech signal reproducing unit 92 to a telephone specified by a telephone number corresponding to a transmitter's electronic mail.

In the above configuration of the facsimile apparatus 91, before a transmitter transmits facsimile data, an informing telephone number of the transmitter is registered as a transmitter's identification number of the facsimile data in advance. Also, a receiver's electronic mail address and the telephone number partitioned by a symbol # are written in a sub-address of the facsimile data in advance. Thereafter, when the facsimile data is received by the facsimile data communicating unit 74 of the facsimile apparatus 91, a set of a transmitter's electronic mail address generated by the mail addresses generating unit 75, the informing telephone number and the receiver's electronic mail address is registered in the corresponding table.

FIG. 31 is a flow chart showing an operation performed by the facsimile apparatus 91 according to the fourteenth embodiment when a receiver's electronic mail transmitted from the personal computer 64 is returned to the facsimile apparatus 91.

When a receiver's electronic mail is returned to the LAN control unit 78 as a reply of a transmitter's electronic mail in the step S211, the transmitter's electronic mail address (or a user's name), the informing telephone number and the receiver's electronic mail address are retrieved from the corresponding table stored in the RAM 73 (step S251). Thereafter, a mail address of the receiver written in the header of the receiver's electronic mail by the receiver is compared with the receiver's electronic mail address retrieved from the corresponding table (step S252). Thereafter, it is judged in the CPU 80 whether or not the mail address of the receiver agrees with the receiver's electronic mail address (step S253).

In cases where the mail address of the receiver agrees with the receiver's electronic mail address, a speech file of a speech signal indicating a message "successful transmission" is read out from the RAM 73 and is combined with the receiver's electronic mail address (step S254). Thereafter, the speech signal indicating the message "successful transmission" is reproduced from the speech file by the speech signal reproducing unit 92, and the speech signal is transmitted to a telephone specified by the informing telephone number through the speech signal transmitting unit 93 (step S255).

In contrast, in cases where the mail address of the receiver does not agree with the receiver's electronic mail address, a speech file of a speech signal indicating a message "transmission error" is read out from the RAM 73 and is combined with the receiver's electronic mail address (step S256). Thereafter, the speech signal indicating the message "transmission error" is reproduced from the speech file by the speech signal reproducing unit 92, and the speech signal is transmitted to the telephone specified by the informing telephone number through the speech signal transmitting unit 93 (step S255).

Accordingly, in cases where the transmitter's electronic mail is correctly received by the receiver, the transmitter can hear the speech message "successful transmission" on the telephone. Also, in cases where a transmission error occurs in the transmission of the transmitter's electronic mail, the transmitter can hear the speech message "transmission error" on the telephone. Therefore, the transmitter can easily know the successful transmission or the transmission error.

Next, an operation performed in the facsimile apparatus 91 is described with reference to FIG. 32 according to a fifteenth embodiment of the present invention.

In this embodiment, before a transmitter transmits facsimile data through his facsimile 62, an informing electronic mail address of the transmitter is registered as a transmitter's identification number of the facsimile data in advance. The informing electronic mail address indicates a first personal computer 64 of the transmitter. Also, a receiver's electronic mail address and the informing electronic mail address partitioned by a symbol # are written in a sub-address of the facsimile data in advance. The receiver's electronic mail address specifies a second personal computer 64.

FIG. 32 is a flow chart showing an operation performed by the facsimile apparatus 71 according to the fifteenth embodiment when facsimile data is received in the facsimile apparatus 71.

When the facsimile data transmitted from one facsimile 62 is received in the facsimile apparatus 71 (step S201), the receiver's electronic mail address and the informing electronic mail address written in the facsimile data are recognized (step S261), a format of the facsimile data is converted to a mail format to change the facsimile data to a transmitter's electronic mail (step S262), the informing mail address of the transmitter is registered in a header of the transmitter's electronic mail as a transmitter's electronic mail address (step S263), and the transmitter's electronic mail is transmitted from the LAN control unit 78 to the second personal computer 64 specified by the receiver's electronic mail address through the LAM (or internet) 65 (step S264).

Thereafter, a receiver's electronic mail indicating a reply of the transmitter's electronic mail or error information is directly transmitted from the second personal computer 64 to the first personal computer 64 of the transmitter without passing the facsimile apparatus 71.

Accordingly, because the receiver's electronic mail can be received by the personal computer 64 of the transmitter, transmission error information or successful transmission information can be directly informed the transmitter without passing the information through the facsimile apparatus 71.

Also, because the receiver's electronic mail is changed to receiver's facsimile data in the facsimile apparatus 71, 81 or 91 in the eighth to thirteenth embodiments, in cases where the transmitter intends to display the receiver's facsimile data on the first personal computer 64, it is required to read an image of the receiver's facsimile data with a scanner and transmit the image to the first personal computer 64 of the transmitter. Therefore, it is troublesome to display the receiver's facsimile data on the first personal computer 64 in the eighth to thirteenth embodiments. However, because the receiver's electronic mail is received by the personal computer 64, the transmitter can easily display the receiver's electronic mail on his personal computer 64.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An image communicating method, comprising the steps of:
    inputting a password at a transmitting side;
    producing image data indicating a particular image written in a particular paper at the transmitting side;
    using part of the image data being transmitted to cipher the password;
    selecting one or more pieces of character code data from the image data at the transmitting side;
    ciphering the password at the transmitting side by using the character code data as a cipher key;
    inserting the ciphered password into the image data at the transmitting side;
    transmitting transmission data including the image data and the ciphered password from the transmitting side to a relay station by an electronic mail through an internet;
    receiving the transmission data including the image data and the ciphered password at the relay station;
    selecting the pieces of character code data from the image data of the transmission data at the relay station;
    deciphering the ciphered password included in the image data at the relay station by using the character code data as the cipher key;
    judging at the relay station whether or not the deciphered password agrees with a prescribed password peculiar to the relay station; and
    relay-transmitting the image data from the relay station to a facsimile of a receiving side to reproduce the particular image at the receiving side in cases where the deciphered password agrees with the prescribed password.

2. An image communicating method according to claim 1 in which the step of inputting a pass-word includes the step of
    inputting a character stream instructing a facsimile transmission and a facsimile number designating the facsimile of the receiving side, and the step of relay-transmitting the image data from the relay station to a facsimile of a receiving side includes the step of
    determining a facsimile transmission of the image data according to the character stream, and
    determining the facsimile of the receiving side, to which the image data is transmitted, according to the facsimile number.

3. An image communicating method according to claim 1 in which the step of judging in the relay station includes the steps of
    judging whether or not a particular paper size of the particular paper in which the particular image is written is larger than a prescribed paper size treatable on the receiving side, and
    adjusting the image data to reproduce the particular image on a paper of a prescribed paper size treatable on the receiving side in cases where the particular paper size is larger than the prescribed paper size.

4. An image communicating method according to claim 1 in which the step of relay-transmitting the image data from the relay station to a facsimile of a receiving side includes the steps of
    judging in the relay station whether or not an error occurs in the relay-transmission of the image data to the facsimile of the receiving side, and
    informing the transmitting side that an error occurs in cases where the error occurs in the relay transmission of the image data to the facsimile of the receiving side.

5. An image communicating method according to claim 1 in which the step of relay-transmitting the image data from the relay station to a facsimile of a receiving side includes the steps of
    informing the transmitting side that an error occurs in cases where the deciphered pass-word does not agrees with the prescribed pass-word.

6. An image communicating method according to claim 1 in which date information indicating a transmission date is included in the transmission data.

7. A facsimile type electronic mail apparatus, comprising:
    inputting means of a transmitting side for inputting a password;
    reading means of the transmitting side for reading a particular image written in a particular paper of a particular paper size to produce image data indicating the particular image;
    ciphering means of the transmitting side using part of the image data to cipher the password, said ciphering means selecting one or more pieces of character code data from the image data produced by the reading means, ciphering the password input by the inputting means by using the character code data from the image data as a cipher key to produce a ciphered password and inserting the ciphered password in the image data;
    transmitting means of the transmitting side for transmitting transmission data including the image data produced by the reading means to a relay station by an electronic mail through an internet;
    receiving means of the relay station for receiving the transmission data including the image data and the ciphered password through the internet;
    deciphering means of the relay station for extracting the ciphered password added to the image data, selecting the pieces of character code data from the image data and deciphering the ciphered password by using the character code data as the cipher key to produce a deciphered password;
    judging means of the relay station for judging whether or not the deciphered password agrees with a prescribed password peculiar to the relay station; and
    facsimile communicating means of the relay station for relay-transmitting the image data received by the receiving means to a facsimile of a receiving side to reproduce the particular image at the receiving side in cases where it is judged by the judging means that the deciphered password agrees with the prescribed password.

8. A facsimile type electronic mail apparatus according to claim 7 in which a character stream instructing a facsimile transmission and a facsimile number designating the facsimile are input by the inputting means, a facsimile transmission of the image data is determined by the judging means according to the character stream, and the facsimile to which the image data is transmitted by the facsimile communicating means is determined by the judging means according to the facsimile number.

9. A facsimile type electronic mail apparatus according to claim 7 in which it is judged by the judging means whether or not the particular paper size of the particular paper is larger than a prescribed paper size treatable on the receiving side, the facsimile type electronic mail apparatus further comprises
adjusting means of the relay station for adjusting the image data to produce adjusted image data indicating a downsized particular image reproducible on a paper of the prescribed paper size in cases where it is judged by the judging means that the particular paper size is larger than the prescribed paper size, and
the adjusted image data produced by the adjusting means is transmitted to the facsimile of the receiving side by the facsimile communicating means to reproduce the downsized particular image on the receiving side.

10. A facsimile type electronic mail apparatus according to claim 7 in which an address of the transmitting side is input by the inputting means, the address of the transmitting side is transmitted to the relay station with the mail data as header information of the electronic mail by the transmitting means, and
error information is transmitted from the relay station to the transmitting side according to the header information in cases where an error occurs in the relay-transmission of the image data performed by the facsimile communicating means.

11. A facsimile type electronic mail apparatus according to claim 7 in which date information indicating a transmission date is included in the transmission data used by the ciphering means.

12. A facsimile type electronic mail apparatus, comprising:
inputting-means for inputting a pass-word and print data which is reproducible in a particular paper and is transmitted from a terminal to a transmitting side through a local area network;
ciphering means for ciphering the pass-word input by the inputting means on the transmitting side to produce a ciphered pass-word;
inserting means for inserting the ciphered pass-word ciphered by the ciphering means, an electronic mail address indicating an error information receiving apparatus and a facsimile number indicating a facsimile into the print data input by the inputting means on the transmitting side;
transmitting and receiving means for transmitting the print data, in which the ciphered pass-word, the electronic mail address and the facsimile number are inserted by the inserting means, by an electronic mail on the transmitting side and receiving the print data through an internet on a receiving side;
print data analyzing means for analyzing the print data received by the transmitting and receiving means on the receiving side to extract the ciphered pass-word, the facsimile number and the electronic mail address from the print data;
deciphering means for deciphering the ciphered pass-word extracted by the print data analyzing means on the receiving side to produce a deciphered pass-word;
facsimile communicating means for transmitting the print data to the facsimile, which is indicated by the facsimile number extracted by the print data analyzing means, to output the print data; and
control means for judging whether or not the deciphered pass-word deciphered by the deciphering means agrees with a prescribed pass-word peculiar to the receiving side, judging whether or not an error occurs in the transmission of the print data performed by the facsimile communicating means and informing the error information receiving apparatus, which is indicated by the electronic mail address extracted by the print data analyzing means, of the occurrence of an error by an electronic mail through the local area network in cases where the error occurs in the transmission of the print data to the facsimile and the deciphered pass-word agrees with the prescribed pass-word.

13. A method for transmitting image data, comprising the steps of:
inputting a password at a transmitting side;
producing image data indicating a particular image written in a particular paper;
using part of the image data being transmitted to cipher the password;
selecting at least one piece of character code data from the image data;
ciphering the password by using the selected character code data as a cipher key;
inserting the ciphered password into the image data;
transmitting transmission data including the image data and the ciphered password from the transmitting side to a relay station by an electronic mail through an internet.

14. A method for receiving image data, comprising the steps of:
receiving transmission data including image data and a ciphered password at a relay station by electronic mail through an internet, said ciphered password being ciphered at a transmitting side by using at least one piece of character code data contained in said image data as a cipher key;
selecting the at least one piece of character code data from the image data of the transmission data;
deciphering the ciphered password included in the image data by using the selected character code data as the cipher key;
judging whether or not a deciphered password agrees with a prescribed password peculiar to the relay station; and
relay-transmitting the image data to a facsimile of a receiving side to reproduce a particular image at the receiving side in cases where the deciphered password agrees with the prescribed password.

* * * * *